(12) United States Patent
Tanaka et al.

(10) Patent No.: US 10,597,796 B2
(45) Date of Patent: Mar. 24, 2020

(54) POLYETHYLENE POWDER FOR FIBER, FIBER, AND ARTICLE

(71) Applicant: Asahi Kasei Chemicals Corporation, Tokyo (JP)

(72) Inventors: Kenya Tanaka, Tokyo (JP); Akio Fujiwara, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 594 days.

(21) Appl. No.: 14/689,287

(22) Filed: Apr. 17, 2015

(65) Prior Publication Data

US 2015/0299903 A1  Oct. 22, 2015

(30) Foreign Application Priority Data

Apr. 18, 2014 (JP) ................. 2014-086756

(51) Int. Cl.
*D01F 6/04* (2006.01)
*C08F 110/02* (2006.01)

(52) U.S. Cl.
CPC .............. *D01F 6/04* (2013.01); *C08F 110/02* (2013.01); *D10B 2321/021* (2013.01)

(58) Field of Classification Search
CPC ... D01F 6/04; C08F 110/02; D10B 2321/021; D10B 2321/0211; B32B 5/16; C01P 2004/51; C08L 23/06; C09D 7/66
USPC ......................................... 428/372, 402–407
See application file for complete search history.

(56) References Cited

U.S. PATENT DOCUMENTS

| | | | | |
|---|---|---|---|---|
| 3,843,620 A | * | 10/1974 | Piekarski | C08F 10/00 502/102 |
| 3,954,927 A | * | 5/1976 | Duling | C08J 9/26 264/49 |
| 4,972,035 A | * | 11/1990 | Suga | C08J 3/12 526/125.6 |
| 5,032,338 A | * | 7/1991 | Weedon | B29C 55/005 264/203 |
| 6,225,424 B1 | | 5/2001 | Nishikawa et al. | |
| 2003/0203204 A1 | | 10/2003 | Ohta et al. | |
| 2010/0016481 A1 | * | 1/2010 | Hagstrand | C08K 5/13 524/99 |
| 2010/0069687 A1 | | 3/2010 | Kosover et al. | |
| 2011/0256402 A1 | * | 10/2011 | Sugiyama | C08F 10/00 428/402 |
| 2012/0073631 A1 | | 3/2012 | Ikenaga et al. | |
| 2013/0046040 A1 | * | 2/2013 | Srinivasan | B01D 39/1661 521/143 |
| 2013/0209707 A1 | * | 8/2013 | Sandkuehler | D01D 5/426 428/17 |

FOREIGN PATENT DOCUMENTS

| | | |
|---|---|---|
| JP | H07-59652 B2 | 6/1995 |
| JP | H11-080257 A | 3/1999 |
| JP | 2000-144522 A | 5/2000 |
| JP | 2004-225057 A | 8/2004 |
| JP | 2013-506751 A | 2/2013 |
| JP | 2014-040525 A | 3/2014 |
| JP | 2014-055287 A | 3/2014 |
| KR | 2012-0024690 A | 3/2012 |
| WO | 01/12885 A1 | 2/2001 |

OTHER PUBLICATIONS

Neikov, Oleg D. Naboychenko, Stanislav S. Murashova, Irina V. Gopienko, Victor G. Frishberg, Irina V. Lotsko, Dina V.. (2009). Handbook of Non-Ferrous Metal Powders—Technologies and Applications—1.7.8 Tap Density. Elsevier. Online version available at: http://app.knovel.com/hotlink/pdf/id:kt006QPX17/handbook-non-ferrous/tap-density.*
Bhandari, Bhesh Bansal, Nidhi Zhang, Min Schuck, Pierre. (2013). Handbook of Food Powders—Processes and Properties—17.3.1.4 Flowability. Woodhead Publishing. Online version available at: http://app.knovel.com/hotlink/pdf/id:kt00C5BGL5/handbook-food-powders/flowability.*
Lloyd, Dhanlal De. "Standard Sieves and Mesh Sizes." Analytical Chemistry Resources. The University of the West Indies, 2000. Web. Jul. 7, 2017. <http://delloyd.50megs.com/moreinfo/mesh.html>.*

* cited by examiner

*Primary Examiner* — Laura C Powers
*Assistant Examiner* — Larissa E Rowe
(74) *Attorney, Agent, or Firm* — Morgan, Lewis & Bockius LLP

(57) ABSTRACT

An object of the present invention is to provide a polyethylene powder for a fiber which is excellent in the color tone of an obtained article and allows an obtained fiber to be highly drawn, and a fiber and an article made of the polyethylene powder for a fiber. The present invention provides a polyethylene powder for a fiber, wherein the intrinsic viscosity measured at 135° C. in decalin is 10 dL/g or higher and 40 dL/g or lower, the total amount of Al, Mg, Ti, Zr, and Hf is 1.0 ppm or higher and lower than 15 ppm, the amount of a particle having a particle size exceeding 355 μm is 2.0% by mass or lower, and the amount of a particle having a particle size of 75 μm or smaller is 3.0% by mass or higher and 50.0% by mass or lower.

11 Claims, No Drawings

POLYETHYLENE POWDER FOR FIBER, FIBER, AND ARTICLE

TECHNICAL FIELD

The present invention relates to a polyethylene powder for a fiber, a fiber, and an article.

DESCRIPTION OF THE RELATED ART

Background Art

Polyethylene powder is employed in various uses such as for films, sheets, microporous membranes, fibers, foams, and pipes. Particularly, high molecular weight polyethylenes are used as raw materials for microporous membranes for separators of secondary batteries typified by lead storage batteries and lithium ion batteries and as raw materials for high strength fibers. These high molecular weight polyethylenes are used because the high molecular weight polyethylenes have excellent drawing workability, high strength, and high chemical stability as well as excellent long term reliability because of their high molecular weights.

Polyethylenes, however, are susceptible to degradation by the action of heat, light, oxygen, nitrogen oxide, etc., and are disadvantageously softened, embrittled, or discolored, or exhibit reduced mechanical properties in association with these phenomena when processed or used as products.

Particularly, the processing of ultrahigh molecular weight polyethylenes into high strength fibers, for example, tend to cause the problems as described above, because the ultrahigh molecular weight polyethylenes are exposed to a high temperature for a long time in the step of preparing spinning solutions by completely dissolving the polyethylenes in decalin and in the spinning step (see e.g., Patent Literature 1).

Well known methods for solving such problems involve allowing a resin composition to contain an antioxidant such as a phenol, phosphorus, or amine compound. For example, Patent Literature 2 discloses that the combined use of a specific phenol compound and phosphorus compound is effective for preventing degradation.

During spinning at a high temperature, however, resistance to discoloration is disadvantageously significantly deteriorated if the amount of the antioxidant added is increased for the purpose of preventing degradation caused by heat or oxidation.

In this respect, there is a demand for a polyethylene powder for a fiber that is excellent in color tone and resistance to discoloration by preventing the degradation of a high molecular weight polyethylene.

In response to this, Patent Literature 3 discloses that the combined use of a specific phenol compound and phosphorus compound with hydrotalcite (aluminum magnesium hydroxide carbonate hydrate) yields a polyethylene fiber that is less susceptible to discoloration even if the amount of the antioxidant added is increased.

CITATION LIST

Patent Literature

Patent Literature 1: WO01/012885
Patent Literature 2: Japanese Patent Publication No. 7-59652
Patent Literature 3: Japanese Patent Laid-Open No. 2000-144522

SUMMARY OF INVENTION

Technical Problem

The approach of Japanese Patent Laid-Open No. 2000-144522 still offers an insufficient degree of whiteness, though the resistance to discoloration is improved. In addition, not only is the antioxidant limited by its type, but other problems of this approach are: hydrotalcite, which is an inorganic material, tends to form unmelted matter, which requires time for preparing a spinning solution, causes a fiber to be cut during spinning, or partially reduces the mechanical strength of the fiber.

The present invention has been made in light of these problems, and an object of the present invention is to provide a polyethylene powder for a fiber which is excellent in the color tone of an obtained article and allows an obtained fiber to be highly drawn, and a fiber and an article made of the polyethylene powder for a fiber.

Solution to Problem

The present inventors have conducted diligent studies to attain the object and consequently completed the present invention by finding that the object can be attained by a predetermined polyethylene powder.

Specifically, the present invention is as follows:

[1] A polyethylene powder for a fiber, wherein
an intrinsic viscosity measured at 135° C. in decalin is 10 dL/g or higher and 40 dL/g or lower,
a total amount of Al, Mg, Ti, Zr, and Hf is 1.0 ppm or higher and lower than 15 ppm,
an amount of a particle having a particle size exceeding 355 μm is 2.0% by mass or lower, and
an amount of a particle having a particle size of 75 μm or smaller is 3.0% by mass or higher and 50.0% by mass or lower.
[2] The polyethylene powder for the fiber according to [1], wherein a total amount of chlorine is 20 ppm or lower.
[3] The polyethylene powder for the fiber according to [1] or [2], wherein a total amount of Fe, Ni, Cu, Cr, and Mo is 3.0 ppm or lower.
[4] The polyethylene powder for the fiber according to any one of [1] to [3], wherein an average particle size is 50 μm or larger and 200 μm or smaller.
[5] The polyethylene powder for the fiber according to any one of [1] to [4], wherein a tap density is 0.50 g/cm$^3$ or higher and 0.65 g/cm$^3$ or lower.
[6] The polyethylene powder for the fiber according to any one of [1] to [5], wherein a powder flowability is 40 seconds or less.
[7] The polyethylene powder for the fiber according to any one of [1] to [6], comprising an ethylene homopolymer.
[8] The polyethylene powder for the fiber according to any one of [1] to [7], wherein an amount of a volatile component is 0.30% by mass or lower.
[9] A fiber which is obtained using the polyethylene powder for the fiber according to any one of [1] to [8].
[10] The fiber according to [9], comprising an antioxidant, wherein
an amount of the antioxidant is 100 ppm or higher and 5000 ppm or lower.
[11] An article comprising the fiber according to [9] or [10], the article being selected from the group consisting of ropes, nets, bulletproof clothing, protective clothing, protective gloves, fiber-reinforced concrete products, and helmets.

Advantageous Effects of Invention

The present invention can provide a polyethylene powder for a fiber which is excellent in the color tone of an obtained article and allows an obtained fiber to be highly drawn, and a fiber and an article which are each made of the polyethylene powder for a fiber and are excellent in heat resistance and weather resistance.

DESCRIPTION OF EMBODIMENT

Hereinafter, a mode for carrying out the present invention (hereinafter, simply referred to as the "present embodiment") will be described in detail. However, the present invention is not intended to by limited thereby. Various changes or modifications can be made in the present invention without departing from the spirit thereof.
[Polyethylene Powder for Fiber]

The polyethylene powder for a fiber (hereinafter, also simply referred to as a "polyethylene powder") according to the present embodiment is a polyethylene powder for a fiber, wherein the intrinsic viscosity measured at 135° C. in decalin is 10 dL/g or higher and 40 dL/g or lower, the total amount of Al, Mg, Ti, Zr, and Hf is 1.0 ppm or higher and lower than 15 ppm, the amount of a particle having a particle size exceeding 355 μm is 2.0% by mass or lower, and the amount of a particle having a particle size of 75 μm or smaller is 3.0% by mass or higher and 50.0% by mass or lower.

The polyethylene powder for a fiber thus configured according to the present embodiment is excellent in the color tone of an obtained article and allows an obtained fiber to be highly drawn. In addition, the polyethylene powder for a fiber according to the present embodiment is excellent in solubility in a solvent, less likely to form a gel during dissolution, and excellent in heat resistance and weather resistance. A fiber or an article which is obtained using the polyethylene powder for a fiber is also excellent in resistance to discoloration.

Specific examples of the polyethylene used in the present embodiment include, but are not particularly limited to, ethylene homopolymers and copolymers of ethylene with olefin(s) copolymerizable with ethylene. Among them, a polyethylene powder for a fiber comprising an ethylene homopolymer or a polyethylene powder for a fiber consisting of an ethylene homopolymer is preferred. Use of the ethylene homopolymer tends to further improve drawing properties and resistance to discoloration.

The "ethylene homopolymer" means a substantial ethylene homopolymer in which 99.5 mol % or more, preferably 99.8 mol % or more, of the repeating units consist of ethylene. In this context, a branch may be introduced thereto by the addition of a copolymerization component such as α-olefin in a very small amount for the purpose of improving side reaction of polymerization or a polymerization rate or improving the creep characteristics or the like of the finally obtained fiber. On the other hand, a relatively smaller amount of the copolymerization component such as α-olefin is more preferred from the viewpoint of heat resistance and weather resistance.

Specific examples of the olefin copolymerizable with ethylene include, but are not particularly limited to, at least one olefin selected from the group consisting of α-olefins having 3 to 20 carbon atoms, cyclic olefins having 3 to 20 carbon atoms, compounds represented by the formula $CH_2$=$CHR1$ (wherein R1 is an aryl group having 6 to 20 carbon atoms), and linear, branched, or cyclic dienes having 4 to 20 carbon atoms. Among them, the copolymerizable olefin is preferably propylene or 1-butene from the viewpoint of heat resistance and strength of an article typified by a membrane or a fiber. When the polyethylene is a copolymer of ethylene and the olefin, the molar ratio of the ethylene to the copolymer is preferably 50 mol % or more and 100 mol % or less, more preferably 80 mol % or more and 100 mol % or less, further preferably 90 mol % or more and 100 mol % or less. The polyethylene containing the ethylene at the molar ratio within the range mentioned above tends to have better heat resistance and/or strength.
[Intrinsic Viscosity]

The intrinsic viscosity of the polyethylene powder of the present embodiment measured at 135° C. in decalin is 10 dL/g or higher and 40 dL/g or lower, preferably 12 dL/g or higher and 38 dL/g or lower, more preferably 14 dL/g or higher and 35 dL/g or lower.

The intrinsic viscosity of 10 dL/g or higher yields an article having better strength. On the other hand, the intrinsic viscosity of 40 dL/g or lower improves the solubility of the polyethylene powder in a solvent and allows a homogeneous solution having no unmelted matter to be formed in a short time. The resulting fiber has better production stability and mechanical strength. The fiber also has excellent drawing properties and better workability.

One example of methods for controlling the intrinsic viscosity within the range mentioned above includes the change of the polymerization temperature of a reactor for polymerization for the polyethylene. In general, a higher polymerization temperature tends to decrease the molecular weight of the resulting polymer, while a lower polymerization temperature tends to increase the molecular weight of the resulting polymer. Another example of the methods for controlling the intrinsic viscosity within the range mentioned above includes the addition of a chain transfer agent such as hydrogen during polymerization for the polyethylene. The addition of such a chain transfer agent tends to decrease the molecular weight of the formed polyethylene even if the polymerization temperature is the same. In the present embodiment, the intrinsic viscosity is preferably controlled by the combination of these methods.

The intrinsic viscosity of the polyethylene powder according to the present embodiment can be determined by: dissolving the polyethylene powder at different concentrations in decalin to prepare solutions; measuring the viscosities of the solutions at 135° C.; and extrapolating reduced viscosities calculated from the measured solution viscosities to the concentration 0.
[Total Amount of Al, Mg, Ti, Zr, and Hf]

The total amount of Al, Mg, Ti, Zr, and Hf contained in the polyethylene powder according to the present embodiment is 1.0 ppm or higher and lower than 15 ppm, preferably 1.0 ppm or higher and 12 ppm or lower, more preferably 1.0 ppm or higher and 10 ppm or lower. The total amount of Al, Mg, Ti, Zr, and Hf mainly refer to catalyst residues.

The polyethylene powder having a total amount of Al, Mg, Ti, Zr, and Hf within the range mentioned above is less likely to be colored. The molded polyethylene is prevented from being degraded and is less susceptible to embrittlement, discoloration, reduction in mechanical properties, etc., resulting in better long-term stability. More specifically, the total amount of Ti, Zr, and Hf is preferably 3 ppm or lower, the amount of Al is preferably 5 ppm or lower, and the amount of Mg is preferably 5 ppm or lower. All of these metals influence the degradation of the polyethylene. When the polyethylene powder is particularly employed in outdoor use under stress, for example, a rope for ship mooring, the total amount of Al, Mg, Ti, Zr, and Hf within the range mentioned above can therefore drastically improve durability.

The total amount of Al, Mg, Ti, Zr, and Hf contained in the polyethylene powder according to the present embodiment can be controlled by polyethylene productivity per unit catalytic amount. The polyethylene productivity can be controlled by the polymerization temperature of a reactor for production, polymerization pressure, and slurry concentration. Examples of methods for enhancing the productivity of the polyethylene used in the present embodiment include the increase of the polymerization temperature, the increase of the polymerization pressure, and/or the increase of the slurry concentration. The catalyst used is not particularly limited, and a general Ziegler-Natta catalyst or metallocene catalyst can be used. A catalyst mentioned later is preferably used.

Alternatively, the metals may be removed from the polyethylene powder as much as possible by, for example, a method which involves separating the polyethylene powder from the solvent by centrifugation to adjust the amount of the solvent contained in the polyethylene powder before drying to 70% by mass or lower with respect to the weight of the polyethylene powder, a method which involves separating the solvent as much as possible by centrifugation and then deactivating the catalyst, or a method which involves washing the polyethylene powder with water or a weakly acidic aqueous solution. The total amount of Al, Mg, Ti, Zr, and Hf can be measured by a method described in Examples mentioned later.

[Amount of Particle (Polyethylene Powder) Having Particle Size Exceeding 355 μm]

The amount of a polyethylene powder having a particle size exceeding 355 μm in the polyethylene powder according to the present embodiment is 2.0% by mass or lower, preferably 1.3% by mass or lower, more preferably 1.0% by mass or lower. The lower limit of the amount of the polyethylene powder having a particle size exceeding 355 μm is not particularly limited. A lower amount is more preferred, and 0% by mass is further preferred. The polyethylene powder containing the polyethylene powder having a particle size exceeding 355 μm at an amount of 2.0% by mass or lower has better solubility in a solvent and can form a homogeneous solution having no unmelted matter in a short time. The resulting fiber has better production stability and mechanical strength, particularly, better strength against stress. Also, the polyethylene is prevented from being degraded.

The amount of such a particle having a particle size exceeding 355 μm can be controlled by use of a catalyst having a small particle size or a catalyst having a narrow particle size distribution as the catalyst for polymerization for the polyethylene or by the removal of a coarse particle portion in the catalyst through a filter or the like. Alternatively, the amount may be controlled by conditions for polymerization for the polyethylene. The formation of the particle having a particle size exceeding 355 μm may be controlled by, for example, the decrease of the polymerization pressure or the shortening of a residence time in a reactor. Also, the amount of the particle having a particle size exceeding 355 μm may be controlled by classification through a sieve after polymerization and drying steps. The amount of the polyethylene powder having a particle size exceeding 355 μm can be determined as the proportion of particles that do not pass through a sieve having an aperture size of 355 μm. The "proportion of particles that do not pass through a sieve having an aperture size of 355 μm" refers to the sum of the weights of particles remaining on sieves having an aperture size of 355 μm or larger among all the particles. The amount of the polyethylene powder having a particle size exceeding 355 μm can be measured by a method described in Examples mentioned later.

[Amount of Particle (Polyethylene Powder) Having Particle Size of 75 μm or Smaller]

The amount of a polyethylene powder having a particle size of 75 μm or smaller in the polyethylene powder according to the present embodiment is 3.0% by mass or higher and 50.0% by mass or lower, preferably 4.0% by mass or higher and 40.0% by mass or lower, more preferably 5.0% by mass or higher and 30.0% by mass or lower. Usually, such fine particles are removed from the viewpoint of handleability. By contrast, a feature of the polyethylene powder according to the present embodiment is that the fine particle component is used as an essential component. The particle having a particle size of 75 μm or smaller at an amount of 3.0% by mass or higher and 50.0% by mass or lower is dissolved in a solvent such as decalin or liquid paraffin in a short time in the step of dissolving the polyethylene powder in the solvent. As a result, the viscosity of the whole system is enhanced to promote the solubility of particles having a particle size exceeding 75 μm. The solubility of the whole polyethylene powder is therefore improved, thereby decreasing unmelted matter and reducing unmelted foreign matter during processing into a fiber or the like. Such a polyethylene powder exhibits better applicability to processing in terms of productivity and/or drawing properties, etc.

The amount of the particle (polyethylene particle) having a particle size of 75 μm or smaller can be controlled by use of a catalyst having a small particle size as the catalyst for polymerization for the polyethylene. Alternatively, the amount may be controlled by conditions for polymerization for the polyethylene. The amount of the particle having a particle size of 75 μm or smaller may be controlled by, for example, the decrease of the polymerization pressure or the shortening of a residence time in a reactor. Also, the amount of the particle having a particle size of 75 μm or smaller can be controlled by the addition of a solid catalytic component brought into contact with a promoter into the polymerization system. The amount of the polyethylene particle having a particle size of 75 μm or smaller can be determined as the proportion of particles that have passed through a sieve having an aperture size of 75 μm. The amount of the polyethylene particle having a particle size of 75 μm or smaller can be measured by a method described in Examples mentioned later.

[Total Amount of Chlorine]

The total amount of chlorine contained in the polyethylene powder according to the present embodiment is preferably 20 ppm or lower, more preferably 5 ppm or lower, further preferably 3 ppm or lower, most preferably 1.0 ppm or lower. The lower limit of the total amount of chlorine is not particularly limited. A smaller amount is more preferred, and 0 ppm is further preferred. This total amount of chlorine may be derived from a catalytic component used in the polymerization step. When the total amount of chlorine is 20 ppm or lower, chlorine can be prevented from forming a quinone compound through reaction with an antioxidant or a thermal stabilizer added during processing (i.e., the resulting fiber can be prevented from being colored yellowish). Chlorine forms hydrochloric acid, which may in turn corrode an extruder or a spinning machine during molding so that metal components thereof such as Fe, Ni, Cu, Cr, and Mo are incorporated into the polyethylene. The resulting fiber may be colored yellowish, or the degradation of the resulting polyethylene may be promoted. Provided that the total amount of chlorine is 20 ppm or lower, such coloring or degradation can be suppressed.

The total amount of chlorine contained in the polyethylene powder according to the present embodiment can be controlled by polyethylene productivity per unit catalytic amount. The polyethylene productivity can be controlled by the polymerization temperature of a reactor for production, polymerization pressure, and slurry concentration. Examples of methods for enhancing the productivity of the polyethylene used in the present embodiment include the increase of the polymerization temperature, the increase of the polymerization pressure, and/or the increase of the slurry concentration. The total amount of chlorine contained in the polyethylene powder can also be decreased by use of a catalyst having a small amount of a chlorine component. In an alternative method, the total amount of chlorine contained in the polyethylene powder can be further decreased by use of an inert gas containing water or the like in the devitalization step after polymerization. The catalyst used is not particularly limited, and a general Ziegler-Natta catalyst or metallocene catalyst can be used. A catalyst mentioned later is preferably used. The total amount of chlorine can be measured by a method described in Examples mentioned later.

[Total Amount of Fe, Ni, Cu, Cr, and Mo]

The total amount of Fe, Ni, Cu, Cr, and Mo contained in the polyethylene powder according to the present embodiment is preferably 3.0 ppm or lower, more preferably 2.0 ppm or lower, further preferably 1.0 ppm or lower. The lower limit of the total amount of Fe, Ni, Cu, Cr, and Mo is not particularly limited. A smaller amount is more preferred, and 0 ppm is further preferred. The polyethylene powder containing Fe, Ni, Cu, Cr, and Mo at a total amount of 3.0 ppm or lower has better thermal stability and can yield a fiber having better in long-term stability. When the total amount of Fe, Ni, Cu, Cr, and Mo is 3.0 ppm or lower, the reaction with an antioxidant or a thermal stabilizer added during processing can be suppressed. Thus, the resulting fiber can be prevented from being colored due to the formation of an organic metal complex.

The total amount of Fe, Ni, Cu, Cr, and Mo contained in the polyethylene powder according to the present embodiment can be controlled by the prevention of the corrosion of an extruder or a spinning machine through the decrease of the total amount of chlorine contained in the polyethylene powder mentioned above. Alternatively, the total amount may be controlled by the reduction of the viscosity of a solution kneaded in an extruder. Specifically, the total amount of Fe, Ni, Cu, Cr, and Mo can be controlled by setting the polyethylene concentration in the solution to 10% by mass or lower and setting the extruder temperature to 200° C. or higher and 300° C. or lower. Also, Fe, Ni, Cu, Cr, and Mo can be removed from the polyethylene powder as much as possible by, for example, a method which involves washing the polyethylene powder with an aqueous solution of dilute hydrochloric acid or the like. The total amount of Fe, Ni, Cu, Cr, and Mo can be measured by a method described in Examples mentioned later.

[Average Particle Size]

The average particle size of the polyethylene powder according to the present embodiment is preferably 50 µm or larger and 200 µm or smaller, more preferably 60 µm or larger and 190 µm or smaller, further preferably 70 µm or larger and 180 µm or smaller. The polyethylene powder having an average particle size of 50 µm or larger tends to have a sufficiently high bulk density and flowability and therefore have better handleability, for example, when added to a hopper or the like or weighed from the hopper. On the other hand, the polyethylene powder having an average particle size of 200 µm or smaller tends to have better applicability to processing in terms of productivity and/or drawing properties, etc., when processed into a fiber. The average particle size of the polyethylene powder can be controlled by the particle size of the catalyst used and can also be controlled by polyethylene productivity per unit catalytic amount. The average particle size of the polyethylene powder can be measured by a method described in Examples mentioned later.

[Tap Density]

The tap density of the polyethylene powder according to the present embodiment is preferably 0.50 g/cm$^3$ or higher and 0.65 g/cm$^3$ or lower, more preferably 0.53 g/cm$^3$ or higher and 0.63 g/cm$^3$ or lower, further preferably 0.55 g/cm$^3$ or higher and 0.60 g/cm$^3$ or lower. A powder having fewer aggregates or deformed powders, a shape closer to sphere, and more regular surface organization tends to have a higher tap density. The polyethylene powder having a tap density of 0.50 g/cm$^3$ or higher and 0.65 g/cm$^3$ or lower has excellent resistance to external stress, fewer deformed powders and powder aggregates having distinct solubility, and excellent flowability. The polyethylene powder therefore tends to have better handleability, for example, when added to a hopper or the like or weighed from the hopper. Also, the polyethylene powder tends to better solubility as a whole and exhibit uniform solubility, thereby decreasing unmelted matter and reducing unmelted foreign matter when processed into a fiber or the like. Such a polyethylene powder exhibits better applicability to processing in terms of productivity and/or drawing properties, etc.

The tap density of the polyethylene powder according to the present embodiment can be controlled by introducing slurry after polymerization to a flash tank with an internal temperature adjusted to 30° C. or higher and 40° C. or lower, and blowing a humidified inert gas into the slurry. Examples of the inert gas include nitrogen, helium, neon, and argon. The amount of water in the inert gas is preferably 1 to 10% by volume, more preferably 2 to 8% by volume, further preferably 3 to 5% by volume. The residence time of the slurry for blowing the humidified inert gas thereinto is preferably 0.1 to 2 hours, more preferably 0.3 to 1.5 hours, further preferably 0.5 to 1.0 hours.

Also, the tap density can be controlled by the suppression of heat generation ascribable to rapid polymerization reaction in the production of the polyethylene powder. Specifically, the rapid polymerization reaction or attachments to the wall of a reaction vessel can be reduced, for example, by carrying out continuous polymerization which involves continuously supplying ethylene gas, a solvent, a catalyst, etc., into the polymerization system while continuously discharging them together with produced ethylene polymers, by positioning the exit of a catalyst inlet line as distant as possible from the exit of an ethylene inlet line, or by decreasing the feed concentration of the catalyst. As a result, deformed polyethylene powders or polyethylene powder aggregates can be reduced. The tap density of the polyethylene powder can be measured by a method described in Examples mentioned later.

[Flowability]

The falling time of 50 g of the polyethylene powder through a funnel (hereinafter, referred to as "flowability") is preferably 40 seconds or less, more preferably 35 seconds or less, further preferably 30 seconds or less. The lower limit of the flowability is not particularly limited. A lower flowability is more preferred. The polyethylene powder having a flowability of 40 seconds or less tends to have better applicability to processing in terms of productivity and/or drawing properties, etc., when processed into a fiber or the like. Particularly, the polyethylene powder having a flowability of 40 seconds or less can be continuously fed from a hopper to an extruder without being bridged, and is thus excellent in the productivity of continuous processing.

The flowability of the polyethylene powder can be controlled by polymerization temperature and can be enhanced by a higher polymerization temperature. Alternatively, the flowability of the polyethylene powder may be controlled by stirring intensity in a polymerization reactor and can be enhanced by the increase of the stirring intensity, i.e., the acceleration of the stirring rate. In an alternative method, the flowability can also be enhanced by the addition of a lubricant such as calcium stearate, magnesium stearate, or zinc stearate. The flowability of the polyethylene powder can be measured by a method described in Examples.

[Volatile Component]

The amount of a volatile component that may be contained in the polyethylene powder according to the present embodiment is preferably 0.30% by mass or lower, more preferably 0.20% by mass or lower, further preferably 0.10% by mass or lower. The lower limit of the amount of the volatile component is not particularly limited. A smaller amount is more preferred, and 0% by mass is further preferred. In this context, examples of the volatile component in the polyethylene powder include the solvent, such as isobutene or hexane, used in the polymerization reaction, and comonomer components such as propylene, 1-butene, 1-hexene, and 1-octene. The volatile component further includes, for example, water adsorbed during the storage of the polyethylene powder. The polyethylene powder containing the volatile component in an amount of 0.30% by mass or lower has better solubility in a solvent, thereby decreasing unmelted matter and reducing unmelted foreign matter when processed into a fiber or the like. Such a polyethylene powder exhibits better applicability to processing in terms of productivity and/or drawing properties, etc.

The amount of the volatile component in the polyethylene powder according to the present embodiment can be controlled within the range mentioned above, for example, by sufficiently drying the polyethylene powder at a temperature that does not thermally decompose the polyethylene, or by storing the polyethylene powder by a method which involves keeping the powder from coming into contact with outside air. The amount of the volatile component in the polyethylene powder can be measured by a method described in detail in Examples mentioned later.

[Polymerization Method for Polyethylene]

The catalytic component for use in the production of the polyethylene according to the present embodiment is not particularly limited, and the polyethylene according to the present embodiment can be produced using a general Ziegler-Natta catalyst or metallocene catalyst.

(Ziegler-Natta Catalyst)

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by formula 1 which is soluble in an inert hydrocarbon solvent with a titanium compound (A-2) represented by formula 2:

(A-1): $(M^1)_\alpha(Mg)_\beta(R^2)_a(R^3)_b Y^1_c$ 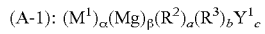 Formula 1 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha+2\beta=a+b+c$ (wherein n represents the valence of $M^1$); and (A-2): $Ti(OR^7)_d X^1_{(4-d)}$ 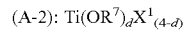 Formula 2 wherein d represents a real number of 0 or larger and 4 or smaller; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane.

First, the compound (A-1) will be described. The compound (A-1) is represented in the form of an organic magnesium complex compound soluble in an inert hydrocarbon solvent, but encompasses all of dihydrocarbyl magnesium compounds and their complexes with other metal compounds. The relational expression $n\alpha+2\beta=a+b+c$ of the symbols α, β, a, b, and c represents the stoichiometry of metal atom valence and substituents.

In formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, pentyl, hexyl, octyl, decyl, cyclohexyl, and phenyl groups. Among them, alkyl groups are preferred. When α>0, a metal atom selected from the group consisting of groups 12, 13, and 14 of the periodic system can be used as the metal atom $M^1$. Examples thereof include zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, for example, a compound wherein $R^2$ is 1-methylpropyl is soluble in an inert hydrocarbon solvent. Such a compound also brings about a preferred consequence to the present embodiment. It is recommended that $R^2$ and $R^3$ satisfy any one of the following three conditions (1), (2), and (3) in formula 1 wherein α=0.

Condition (1): at least one of $R^2$ and $R^3$ is a secondary or tertiary alkyl group having 4 or more and 6 or less carbon atoms, preferably both of $R^2$ and $R^3$ are alkyl groups having 4 or more and 6 or less carbon atoms and at least one of the groups is a secondary or tertiary alkyl group;

Condition (2): $R^2$ and $R^3$ are alkyl groups differing in the number of carbon atoms, preferably $R^2$ is an alkyl group having 2 or 3 carbon atoms and $R^3$ is an alkyl group having 4 or more carbon atoms; and Condition (3): at least one of $R^2$ and $R^3$ is a hydrocarbon group having 6 or more carbon atoms, preferably, an alkyl group wherein the total number of carbon atoms contained in $R^2$ and $R^3$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), specific examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderate long chain alkyl group is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In formula 1, $Y^1$ is any of alkoxy, siloxy, allyloxy, amino, amide, $-N=C-R^4$, $R^5$, $-SR^6$ (wherein $R^4$, $R^5$, and $R^6$ each independently represent a hydrocarbon group having 2 or more and 20 or less carbon atoms), and a β-keto acid residue.

In formula 1, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Examples include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred. Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

In the present embodiment, the compound (A-1) can be synthesized by any method without particular limitations and may be synthesized by reacting an organic magnesium compound selected from the group consisting of the formulas $R^2MgX^1$ and $R^2_2Mg$ (wherein $R^2$ is as defined above, and $X^1$ represents halogen) with an organic metal compound selected from the group consisting of the formulas $M^1R^3_n$ and $M^1R^3_{(n-1)}H$ (wherein $M^1$ and $R^3$ are as defined above, and n represents the valence of $M^1$) at 25° C. or higher and 150° C. or lower in an inert hydrocarbon solvent and, if necessary, subsequently with a compound represented by the formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$—H, the order in which the compounds are added to the reaction system is not particularly limited. Any of the following methods can be used: the compound represented by the formula $Y^1$—H is added into the organic magnesium compound; the organic magnesium compound is added into the compound represented by the formula $Y^1$—H; and both of the compounds are added at the same time.

In the present embodiment, the molar composition ratio $c/(\alpha+\beta)$ of $Y^1$ to all metal atoms in the compound (A-1) is $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by formula 2:

(A-2): $Ti(OR^7)_d X^1_{(4-d)}$　　　　　Formula 2 wherein d represents a real number of 0 or larger and 4 or smaller; $R^7$ represents a hydrocarbon group having 1 or more and 20 or less carbon atoms; and $X^1$ represents a halogen atom.

In formula 2, d is preferably 0 or larger and 1 or smaller, more preferably 0. In formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is most preferably titanium tetrachloride. In the present embodiment, two or more compounds selected from these compounds may be used as a mixture.

Next, the reaction between the compounds (A-1) and (A-2) will be described. The reaction is preferably carried out in an inert hydrocarbon solvent and more preferably carried out in an aliphatic hydrocarbon solvent such as hexane or heptane. In the reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is preferably within the range of −80° C. or higher and 150° C. or lower, more preferably within the range of −40° C. to 100° C. The order in which the compounds (A-1) and (A-2) are added to the reaction system is not particularly limited. Any of the following methods can be used: the compound (A-2) is added subsequently to the compound (A-1); the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

Another example of the Ziegler-Natta catalytic component used in the present embodiment is preferably a catalyst for olefin polymerization comprising a solid catalytic component [C] and an organic metal compound component [B], wherein the solid catalytic component [C] is produced by reacting an organic magnesium compound (C-1) represented by formula 3 which is soluble in an inert hydrocarbon solvent with a chlorinating agent (C-2) represented by formula 4, and allowing an organic magnesium compound (C-4) represented by formula 5 which is soluble in an inert hydrocarbon solvent and a titanium compound (C-5) represented by formula 6 to be supported by a carrier (C-3) thus prepared:

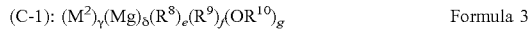

(C-1): $(M^2)_\gamma(Mg)_\delta(R^8)_e(R^9)_f(OR^{10})_g$     Formula 3 wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \leq \gamma$, $0 < \delta$, $0 \leq e$, $0 \leq f$, $0 < g$, $0 < e+f$, $0 \leq g/(\gamma+\delta) \leq 2$, and $k\gamma+2\delta=e+f+g$ (wherein k represents the valence of $M^2$);

(C-2): $H_hSiCl_iR^{11}_{(4-(h+i))}$     Formula 4 wherein $R^{11}$ represents a hydrocarbon group having 1 or more and 12 or less carbon atoms; and h and i each represent a real number that satisfies the following relationships: $0 < h$, $0 < i$, and $0 < h+i < 4$;

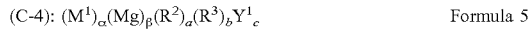

(C-4): $(M^1)_\alpha(Mg)_\beta(R^2)_a(R^3)_bY^1_c$     Formula 5 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha+2\beta=a+b+c$ (wherein n represents the valence of $M^1$); and

(C-5): $Ti(OR^7)_dX^1_{(4-d)}$     Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In formula 3, the relational expression $k\gamma+2\delta=e+f+g$ of the symbols γ, δ, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, methyl, ethyl, propyl, butyl, pentyl, hexyl, octyl, decyl, cyclohexyl, and phenyl groups. Among them, alkyl groups are preferred for each of $R^8$ and $R^9$. When γ>0, a metal atom selected from the group consisting of groups 12, 13, and 14 of the periodic system can be used as the metal atom $M^2$. Examples thereof include zinc, boron, and aluminum. Among them, aluminum and zinc are particularly preferred.

The ratio δ/γ of magnesium to the metal atom $M^2$ is not particularly limited and is preferably 0.1 or more and 30 or less, more preferably 0.5 or more and 10 or less. In the case of using a predetermined organic magnesium compound wherein γ=0, for example, a compound wherein $R^8$ is 1-methylpropyl is soluble in an inert hydrocarbon solvent. Such a compound also brings about a preferred consequence to the present embodiment. It is recommended that $R^8$ and $R^9$ satisfy any one of the following three conditions (1), (2), and (3) in formula 3 wherein γ=0.

Condition (1): at least one of $R^8$ and $R^9$ is a secondary or tertiary alkyl group having 4 or more and 6 or less carbon atoms, preferably, both of $R^8$ and $R^9$ are alkyl groups having 4 or more and 6 or less carbon atoms and at least one of the groups is a secondary or tertiary alkyl group;

Condition (2): $R^8$ and $R^9$ are alkyl groups differing in the number of carbon atoms, preferably, $R^8$ is an alkyl group having 2 or 3 carbon atoms and $R^9$ is an alkyl group having 4 or more carbon atoms; and Condition (3): at least one of $R^8$ and $R^9$ is a hydrocarbon group having 6 or more carbon atoms, preferably, an alkyl group wherein the total number of carbon atoms contained in $R^8$ and $R^9$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), examples of the alkyl group having 2 or 3 carbon atoms include ethyl, 1-methylethyl, and propyl groups. Among them, an ethyl group is particularly preferred. Specific examples of the alkyl group having 4 or more carbon atoms, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group ($OR^{10}$) will be described. The hydrocarbon group represented by $R^{10}$ is preferably an alkyl or aryl group having 1 or more and 12 or less carbon atoms, particularly preferably an alkyl or aryl group having 3 or more and 10 or less carbon atoms. Specific examples of $R^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the present embodiment, the compound (C-1) can be synthesized by any method without particular limitations and is preferably synthesized by a method of reacting an organic magnesium compound selected from the group consisting of the formulas $R^8MgX^1$ and $R^8{}_2Mg$ (wherein $R^8$ is as defined above, and $X^1$ represents a halogen atom) with an organic metal compound selected from the group consisting of the formulas $M^2R^9{}_k$ and $M^2R^9{}_{(k-1)}H$ (wherein $M^2$, $R^9$, and k are as defined above) at a temperature of 25° C. or higher and 150° C. or lower in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio $g/(\gamma+\delta)$ of the alkoxy group to all metal atoms in the resulting alkoxy group-containing organic magnesium compound is $0 \leq g/(\gamma+\delta)$ 2, preferably $0 \leq g/(\gamma+\delta) < 1$.

Next, the compound (C-2) will be described. The compound (C-2) is a silicon chloride compound having at least one Si—H bond, represented by formula 4:

wherein $R^{11}$ represents s hydrocarbon group having 1 or more and 12 or less carbon atoms; and h and i each represent a real number that satisfies the following relationships: $0 < h$, $0 < i$, and $0 < h+i \leq 4$.

In formula 4, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 to 3 carbon atoms, such as methyl, ethyl, propyl, and 1-methylethyl group are more preferred. Each of h and i is a number larger than 0 that satisfies the relationship $h+i \leq 4$. Preferably, i is 2 or larger and 3 or smaller.

Specific examples of such a compound include, but are not particularly limited to, $HSiCl_3$, $HSiCl_2CH_3$, $HSiCl_2C_2H_5$, $HSiCl_2$ $(CH_7)$, $HSiCl_2$ $(2-C_3H_7)$, $HSiCl_2$ $(C_4H_9)$, $HSiCl_2$ $(C_6H_5)$, $HSiCl_2$ $(4-Cl-C_6H_4)$, $HSiCl_2$ $(CH=CH_2)$, $HSiCl_2$ $(CH_2C_6H_5)$, $HSiCl_2$ $(1-C_{10}H_7)$, $HSiCl_2$ $(CH_2CH=CH_2)_2$, $H_2SiCl(CH_3)$, $H_2SiCl(C_2H_5)$, $HSiCl$ $(CH_3)_2$, $HSiCl(C_2H_5)_2$, $HSiCl(CH_3)(2-C_3H_7)$, $HSiCl$ $CH_3$) $(C_6H_5)$, and $HSiCl(C_6H_5)_2$. These silicon chloride compounds are used each alone or as a mixture of two or more types selected from these compounds. Among them, $HSiCl_3$, $HSiCl_2CH_3$, $HSiCl(CH_3)_2$, and $HSiCl_2$ $(C_3H_7)$ are preferred, and $HSiCl_3$ and $HSiCl_2CH_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, more preferably 0.1 mol or higher and 10 mol or lower, of silicon atom contained in the compound (C-2) with respect to 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, the reaction temperature is preferably adjusted to a predetermined temperature by preliminarily setting the temperature of the reactor to a predetermined temperature and adjusting the temperature in the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with the silicon chloride compound to a predetermined temperature and adjusting the temperature in the reactor to a predetermined temperature while introducing the organic magnesium compound to the reactor. In the method of charging a reactor with the compound (C-1) in advance and then introducing the compound (C-2) to the reactor, the reaction temperature is preferably adjusted to a predetermined temperature by adjusting the temperature of the reactor charged with the compound (C-1) to a predetermined temperature and adjusting the temperature in the reactor to a predetermined temperature while introducing the compound (C-2) to the reactor.

Next, the organic magnesium compound (C-4) will be described. The compound (C-4) is preferably represented by formula 5(C-4):

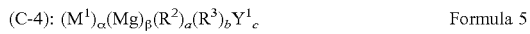

wherein $M^1$ represents a metal atom selected from the group consisting of groups 12, 13, and 14 of the periodic system;

$R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \le \alpha$, $0 \le \beta$, $0 \le a$, $0 \le b$, $0 < a+b$, $0 \le c/(\alpha+\beta) \le 2$, and $n\alpha+2\beta=a+b+c$ (wherein n represents the valence of $M^1$).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably within the range of −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: the compound (C-5) is added subsequently to the compound (C-4); the compound (C-4) is added subsequently to the compound (C-5); and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by formula 6:

$$\text{(C-5): Ti(OR}^7)_d X^1_{(4-d)} \quad \text{Formula 6}$$

wherein d represents a real number of 0 or larger and 4 or smaller; $R^7$ represents a hydrocarbon group having 1 or more and 20 or less carbon atoms; and $X^1$ represents a halogen atom.

In formula 6, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by $X^1$ include, but are not particularly limited to, chlorine, bromine, and iodine. Among them, chlorine is preferred. One compound selected from these compounds may be used alone as the compound (C-5), or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio to magnesium atom contained in the carrier (C-3).

The reaction temperature for the compound (C-5) is not particularly limited and is preferably −80° C. or higher and 150° C. or lower, more preferably within the range of −40° C. or higher and 100° C. or lower.

In the present embodiment, the method for allowing the compound (C-5) to be supported by the carrier (C-3) is not particularly limited and may involve reacting an excess of the compound (C-5) with the carrier (C-3) or using a third component to efficiently support the compound (C-5). A method of achieving this supporting through the reaction between the compound (C-5) and the organic magnesium compound (C-4) is preferred.

Next, the organic metal compound component [B] in the present embodiment will be described. The solid catalytic component in the present embodiment can serve as a highly active catalyst for polymerization by combination with the organic metal compound component [B]. The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/or an organic magnesium compound.

Compounds represented by formula 7 are preferably used each alone or as a mixture as the organic aluminum compound:

$$\text{AlR}^{12}_j Z^1_{(3-j)} \quad \text{Formula 7}$$

wherein $R^{12}$ represents a hydrocarbon group having 1 or more and 20 or less carbon atoms; $Z^1$ represents a group selected from the group consisting of hydrogen, halogen, alkoxy, allyloxy, and siloxy groups; and j represents any number of 2 or larger and 3 or smaller.

In formula 7, specific examples of the hydrocarbon group having 1 or more and 20 or less carbon atoms, represented by $R^{12}$ include, but are not particularly limited to, aliphatic hydrocarbons, aromatic hydrocarbons, and alicyclic hydrocarbons. Preferred examples of such an organic aluminum compound include: trialkyl aluminum compounds such as trimethyl aluminum, triethyl aluminum, tripropyl aluminum, tributyl aluminum, tri(2-methylpropyl) aluminum (or tri-isobutyl aluminum), tripentyl aluminum, tri(3-methylbutyl) aluminum, trihexyl aluminum, trioctyl aluminum, and tridecyl aluminum; aluminum halide compounds such as diethyl aluminum chloride, ethyl aluminum dichloride, bis (2-methylpropyl) aluminum chloride, ethyl aluminum sesquichloride, and diethyl aluminum bromide; alkoxy aluminum compounds such as diethyl aluminum ethoxide and bis(2-methylpropyl) aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by formula 3 which is soluble in an inert hydrocarbon solvent:

$$(M^2)_\gamma (Mg)_\delta (R^8)_e (R^9)_f (OR^{10})_g \quad \text{Formula 3}$$

wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \le \gamma$, $0 \le \delta$, $0 \le e$, $0 \le f$, $0 \le g$, $0 < e+f$, $0 \le g/(\gamma+\delta) \le 2$, and $k\gamma+2\delta=e+f+g$ (wherein k represents the valence of $M^2$).

This organic magnesium compound is represented in the form of an organic magnesium complex compound soluble in an inert hydrocarbon solvent, but encompasses all of dialkyl magnesium compounds and their complexes with other metal compounds. Although γ, δ, e, f, g, $M^2$, $R^8$, $R^9$, and $OR^{10}$ are as already defined, this organic magnesium compound is preferably a compound wherein the ratio δ/γ is in the range of 0.5 to 10 and $M^2$ is aluminum because a compound having higher solubility in an inert hydrocarbon solvent is more preferred.

The method for adding the solid catalytic component and the organic metal compound component [B] into a polymerization system placed under polymerization conditions is not particularly limited. These components may be separately added into the polymerization system, or the components may be reacted in advance and then added into the polymerization system. The ratio between the components to be combined is not particularly limited and is preferably 1 mmol or higher and 3,000 mmol or lower of the organic metal compound component [B] with respect to 1 g of the solid catalytic component.

(Metallocene Catalyst)

A general transition metal compound is used in cases using the metallocene catalyst. Examples of these cases include a production method described in Japanese Patent No. 4868853. Such a metallocene catalyst is constituted by: two catalytic components of a) a transition metal compound having a cyclic η-binding anionic ligand and b) an activating agent capable of forming a complex that exerts catalytic activity through reaction with the transition metal compound.

The transition metal compound having a cyclic η-binding anionic ligand used in the present embodiment can be represented by, for example, the following formula 8:

In formula 8, each $L^1$ independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents each independently represent a substituent having up to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups.

In formula 8, $M^3$ represents a transition metal selected from transition metal groups belonging to group 4 of the periodic system, wherein the formal oxidation number is +2, +3, or +4, and this transition metal is bonded to at least one ligand $L^1$ via $η^5$ bond.

In formula 8, W represents a divalent substituent having up to 50 non-hydrogen atoms, and this divalent substituent monovalently binds to each of $L^1$ and $M^3$ and thereby forms a metallacycle in collaboration with $L^1$ and $M^3$. Each $X^2$ independently represents an anionic σ-binding type ligand having up to 60 non-hydrogen atoms, selected from a monovalent anionic σ-binding type ligand, a divalent anionic σ-binding type ligand divalently binding to $M^3$, and a divalent anionic σ-binding type ligand monovalently binding to each of $L^1$ and $M^3$.

In formula 8, each $X^2$ independently represents a neutral Lewis base-coordinating compound having up to 40 non-hydrogen atoms, and $X^3$ represents a neutral Lewis base-coordinating compound.

j is 1 or 2 provided that when j is 2, two ligands $L^1$ are optionally bonded to each other via a divalent group having up to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group.

k is 0 or 1. p is 0, 1, or 2 provided that: when $X^2$ is a monovalent anionic σ-binding type ligand or a divalent anionic σ-binding type ligand binding to $L^1$ and $M^3$, p is an integer smaller by at least 1 than the formal oxidation number of $M^3$; and when $X^2$ is a divalent anionic σ-binding type ligand binding only to $M^3$, p is an integer smaller by at least (j+1) than the formal oxidation number of $M^3$. q is 0, 1, or 2.

Examples of the ligand $X^2$ in the compound of formula 8 include halides, hydrocarbon groups having 1 to 60 carbon atoms, hydrocarbyloxy groups having 1 to 60 carbon atoms, hydrocarbylamide groups having 1 to 60 carbon atoms, hydrocarbyl phosphide groups having 1 to 60 carbon atoms, hydrocarbyl sulfide groups having 1 to 60 carbon atoms, a silyl group, and combinations thereof.

Examples of the neutral Lewis base-coordinating compound $X^3$ in the compound of formula 8 include phosphines, ethers, amines, olefins having 2 to 40 carbon atoms, dienes having 1 to 40 carbon atoms, and divalent groups induced from these compounds.

In the present embodiment, the transition metal compound having a cyclic η-binding anionic ligand is preferably a transition metal compound represented by formula 8 wherein j=1. Preferred examples of the compound represented by formula 8 wherein j=1 include compounds represented by the following formula 9:

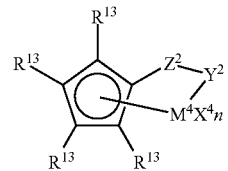

In formula 9, $M^4$ represents a transition metal selected from the group consisting of titanium, zirconium, nickel, and hafnium, wherein the formal oxidation number of the transition metal is +2, +3, or +4. Each $R^{13}$ independently represents a hydrogen atom or a substituent having up to 20 non-hydrogen atoms, selected from the group consisting of hydrocarbon groups having 1 to 8 carbon atoms, a silyl group, a germyl group, a cyano group, halogen atoms, and combinations thereof provided that when the substituent $R^{13}$ is a hydrocarbon group having 1 to 8 carbon atoms, a silyl group, or a germyl group, two adjacent substituents $R^{13}$ are optionally bonded to each other to form a divalent group, which can form a ring in collaboration with the bond between two carbon atoms of the cyclopentadienyl ring bonded to these two adjacent substituents $R^{13}$, respectively.

In formula 9, each $X^4$ independently represents a substituent having up to 20 non-hydrogen atoms, selected from the group consisting of halides, hydrocarbon groups having 1 to 20 carbon atoms, hydrocarbyloxy groups having 1 to 18 carbon atoms, hydrocarbylamino groups having 1 to 18 carbon atoms, a silyl group, hydrocarbylamide groups having 1 to 18 carbon atoms, hydrocarbyl phosphide groups having 1 to 18 carbon atoms, hydrocarbyl sulfide groups having 1 to 18 carbon atoms, and combinations thereof provided that two substituents $X^4$ can optionally form in collaboration a neutral conjugate diene having 4 to 30 carbon atoms or a divalent group.

In formula 9, $Y^2$ represents —O—, —S—, —NR*—, or —PR*— wherein R* represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a combination thereof.

In formula 9, $Z^2$ represents $SiR^*_2$, $CR^*_2$, $SiR^*_2SiR^*_2$, $CR^*_2CR^*_2$, $CR^*=CR^*$, $CR^*_2SiR^*_2$, or $GeR^*_2$ wherein R* is as defined above. n is 1, 2, or 3.

Examples of the transition metal compound having a cyclic η-binding anionic ligand used in the present embodiment include compounds as shown below. Specific examples of the zirconium compounds include, but are not particularly limited to, bis(methylcyclopentadienyl)zirconium dimethyl, bis(n-butylcyclopentadienyl)zirconium dimethyl, bis(indenyl)zirconium dimethyl, bis(1,3-dimethylcyclopentadienyl)zirconium dimethyl, (pentamethylcyclopentadienyl)(cyclopentadienyl)zirconium dimethyl, bis(cyclopentadienyl)zirconium dimethyl, bis(pentamethylcyclopentadienyl)zirconium dimethyl, bis(fluorenyl)zirconium dimethyl, ethylenebis(indenyl)zirconium dimethyl, ethylenebis(4,5,6,7-tetrahydro-1-indenyl)zirconium dimethyl, ethylenebis(4-methyl-1-indenyl)zirconium dimethyl, ethylenebis(5-methyl-1-indenyl)zirconium dimethyl, ethylenebis(6-methyl-1-indenyl)zirconium dimethyl, ethylenebis(7-methyl-1-indenyl)zirconium dimethyl, ethylenebis(5-methoxy-1-indenyl)zirconium dimethyl, ethylenebis(2,3-dimethyl-1-indenyl)zirconium dimethyl, ethylenebis(4,7-dimethyl-1-indenyl)zirconium dimethyl, ethylenebis-(4,7-dimethoxy-1-indenyl)zirconium dimethyl, methylenebis(cyclopentadienyl)zirconium dimethyl, isopropylidene(cyclopentadienyl)zirconium dimethyl, isopropylidene(cyclopentadienyl-fluorenyl)zirconium dimethyl, silylenebis(cyclopentadienyl)zirconium dimethyl, and dimethylsilylene(cyclopentadienyl)zirconium dimethyl.

Specific examples of the titanium compounds include, but are not particularly limited to, [(N-t-butylamido) (tetramethyl-η5-cyclopentadienyl)-1,2-ethanediyl]titanium dimethyl, [(N-t-butylamido) (tetramethyl-η5-cyclopentadienyl)dimethylsilane]titanium dimethyl, [(N-methylamido)(tetramethyl-η5-cyclopentadienyl)dimethylsilane]titanium dimethyl, [(N-phenylamido)(tetramethyl-η5-cyclopentadienyl)dimethylsilane]titanium dimethyl, [(N-benzylamido)(tetramethyl-η5-cyclopentadienyl)dimethylsilane]titanium dimethyl, [(N-t-butylamido) (η5-cyclopentadienyl)-1,2-ethanediyl]titanium dimethyl, [(N-t-butylamido)(η5-cyclopentadienyl)dimethylsilane]titanium dimethyl, [(N-methylamido)(η5-cyclopentadienyl)-1,2-ethanediyl]titanium dimethyl, [(N-methylamido)(η5-cyclopentadienyl)dimethylsilane]titanium dimethyl, [(N-t-butylamido) (η5-indenyl)dimethylsilane]titanium dimethyl, and [(N-benzylamido)(η5-indenyl)dimethylsilane]titanium dimethyl.

Specific examples of the nickel compounds include, but are not particularly limited to, dibromobistriphenylphosphine nickel, dichlorobistriphenylphosphine nickel, dibromodiacetonitrile nickel, dibromodibenzonitrile nickel, dibromo(1,2-bisdiphenylphosphinoethane)nickel, dibromo(1,3-bisdiphenylphosphinopropane)nickel, dibromo(1,1'-diphenylbisphosphinoferrocene)nickel, dimethylbisdiphenylphosphine nickel, dimethyl(1,2-bisdiphenylphosphinoethane)nickel, methyl(1,2-bisdiphenylphosphinoethane)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane)palladium, bistriphenylphosphine palladium bistetrafluoroborate, and bis(2,2'-bipyridine)methyl iron tetrafluoroborate etherate.

Specific examples of the hafnium compounds include, but are not particularly limited to, [(N-t-butylamido) (tetramethyl-η5-cyclopentadienyl)-1,2-ethanediyl]hafnium dimethyl, [(N-t-butylamido) (tetramethyl-η5-cyclopentadienyl)dimethylsilane]hafnium dimethyl, [(N-methylamido)(tetramethyl-η5-cyclopentadienyl)dimethylsilane]hafnium dimethyl, [(N-phenylamido)(tetramethyl-η5-cyclopentadienyl)dimethylsilane]hafnium dimethyl, [(N-benzylamido)(tetramethyl-η5-cyclopentadienyl)dimethylsilane]hafnium dimethyl, [(N-t-butylamido) (η5-cyclopentadienyl)-1,2-ethanediyl]hafnium dimethyl, [(N-t-butylamido)(η5-cyclopentadienyl)dimethylsilane]hafnium dimethyl, [(N-methylamido)(η5-cyclopentadienyl)-1,2-ethanediyl]hafnium dimethyl, [(N-methylamido)(η5-cyclopentadienyl)dimethylsilane]hafnium dimethyl, [(N-t-butylamido) (η5-indenyl)dimethylsilane]hafnium dimethyl, and [(N-benzylamido)(η5-indenyl)dimethylsilane]hafnium dimethyl.

Specific examples of the transition metal compound having a cyclic η-binding anionic ligand used in the present embodiment further include compounds named by the replacement of the moiety "dimethyl" (which appears at the end of the name of each compound, i.e., immediately after the moiety "zirconium" or "titanium", and corresponds to the moiety of $X^4$ in formula 9) in the name of each zirconium compound or titanium compound listed above with, for example, any of "dichloro", "dibromo", "diiodo", "diethyl", "dibutyl", "diphenyl", "dibenzyl", "2-(N,N-dimethylamino)benzyl", "2-butene-1,4-diyl", "s-trans-η4-1,4-diphenyl-1,3-butadiene", "s-trans-η4-3-methyl-1,3-pentadiene", "s-trans-η4-1,4-dibenzyl-1,3-butadiene", "s-trans-η4-2,4-hexadiene", "s-trans-η4-1,3-pentadiene", "s-trans-η4-1,4-ditolyl-1,3-butadiene", "s-trans-η4-1,4-bis(trimethylsilyl)-1,3-butadiene", "s-cis-η4-1,4-diphenyl-1,3-butadiene", "s-cis-η4-3-methyl-1,3-pentadiene", "s-cis-η4-1,4-dibenzyl-1,3-butadiene", "s-cis-η4-2,4-hexadiene", "s-cis-η4-1,3-pentadiene", "s-cis-η4-1,4-ditolyl-1,3-butadiene", and "s-cis-η4-1,4-bis(trimethylsilyl)-1,3-butadiene".

The transition metal compound having a cyclic 1-binding anionic ligand used in the present embodiment can be synthesized by a method generally known in the art. In the present embodiment, these transition metal compounds may be used alone or in combination.

Next, the activating agent b) capable of forming a complex that exerts catalytic activity through reaction with the transition metal compound (hereinafter, also simply referred to as an "activating agent") used in the present embodiment will be described.

Examples of the activating agent according to the present embodiment include compounds represented by the following formula 10:

$$[L^2\text{-}H]^{d+}[M^5{}_mQ_p]^{d-} \qquad \text{Formula 10}$$

wherein $[L^2\text{-}H]^{d+}$ represents a proton-donating Bronsted acid wherein $L^2$ represents a neutral Lewis base, and d represents an integer of 1 to 7; and $[M^5{}_mQ_p]^{d-}$ represents a compatible non-coordinating anion wherein $M^5$ represents a metal belonging to any of groups 5 to 15 of the periodic system, or a metalloid, each Q is independently selected from the group consisting of hydrides, halides, dihydrocarbylamide groups having 2 to 20 carbon atoms, hydrocarbyloxy groups having 1 to 30 carbon atoms, hydrocarbon groups having 1 to 30 carbon atoms, and substituted hydrocarbon groups having 1 to 40 carbon atoms wherein the number of the halide represented by Q is 1 or less, m represents an integer of 1 to 7, p represents an integer of 2 to 14, and d is as defined above provided that p−m=d.

Specific examples of the non-coordinating anion include, but are not particularly limited to, tetrakisphenyl borate, tri(p-tolyl)(phenyl) borate, tris(pentafluorophenyl)(phenyl) borate, tris(2,4-dimethylphenyl)(phenyl) borate, tris(3,5-dimethylphenyl)(phenyl) borate, tris(3,5-di-trifluoromethylphenyl)(phenyl) borate, tris(pentafluorophenyl)(cyclohexyl) borate, tris(pentafluorophenyl)(naphthyl) borate, tetrakis(pentafluorophenyl) borate, triphenyl(hydroxyphenyl) borate, diphenyl-di(hydroxyphenyl) borate, triphenyl(2,4-dihydroxyphenyl) borate, tri(p-tolyl) (hydroxyphenyl) borate, tris(pentafluorophenyl)(hydroxyphenyl) borate, tris (2,4-dimethylphenyl) (hydroxyphenyl) borate, tris(3,5-dimethylphenyl) (hydroxyphenyl) borate, tris(3,5-di-trifluoromethylphenyl)(hydroxyphenyl) borate, tris (pentafluorophenyl)(2-hydroxyethyl) borate, tris (pentafluorophenyl)(4-hydroxybutyl) borate, tris (pentafluorophenyl)(4-hydroxy-cyclohexyl) borate, tris (pentafluorophenyl)(4-(4'-hydroxyphenyl)phenyl) borate, and tris(pentafluorophenyl)(6-hydroxy-2-naphthyl) borate.

Other preferred examples of the non-coordinating anion include borates derived from the borates listed above by the replacement of the hydroxy group with a NHR group wherein R is preferably a methyl group, an ethyl group, or a tert-butyl group.

Specific examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, and tri(n-octyl)ammonium; N,N-dialkylanilinium cations such as N,N-dimethylanilinium, N,N-diethylanilinium, N,N-2,4,6-pentamethylanilinium, and N,N-dimethylbenzylanilinium; dialkylammonium cations such as di-(i-propyl)ammonium and dicyclohexylammonium; triarylphosphonium cations such as triphenylphosphonium, tri(methylphenyl)phosphonium, and tri(dimethylphenyl)phosphonium; and dimethylsulfonium, diethylsulfonium, and diphenylsulfonium.

In the present embodiment, an organic metal oxy compound having unit represented by the following formula 11 may be used as the activating agent:

[Formula 2]

$$(\!-\!M^6R^{14}{}_{n-2}\!-\!O\!-\!)_m \qquad \text{Formula 11}$$

wherein $M^6$ represents a metal belonging to any of groups 13 to 15 of the periodic system, or a metalloid, each $R^{14}$ independently represents a hydrocarbon group having 1 to 12 carbon atoms or a substituted hydrocarbon group, n represents the valence of the metal $M^6$, and m represents an integer of 2 or larger.

As a preferred example, the activating agent of the present embodiment is, for example, an organic aluminum oxy compound comprising a unit represented by the following formula 12:

[Formula 3]

$$(\!-\!AlR^{15}\!-\!O\!-\!)_m \qquad \text{Formula 12}$$

wherein $R^{15}$ represents an alkyl group having 1 to 8 carbon atoms, and m represents an integer of 2 to 60.

As a more preferred example, the activating agent of the present embodiment is, for example, a methylaluminoxane comprising a unit represented by the following formula 13:

[Formula 4]

$$(\!-\!Al(CH_3)\!-\!O\!-\!)_m \qquad \text{Formula 13}$$

wherein m represents an integer of 2 to 60.

In the present embodiment, these activating agent components may be used alone or in combination.

In the present embodiment, such a catalytic component may be used as a supported catalyst in which the component is supported by a solid component. Such a solid component is not particularly limited and is specifically, for example, at least one inorganic solid material selected from: porous polymer materials such as polyethylene, polypropylene, and styrene-divinylbenzene copolymers; inorganic solid materials having an element belonging to any of groups 2, 3, 4, 13, and 14 of the periodic system, such as silica, alumina, magnesia, magnesium chloride, zirconia, titania, boron oxide, calcium oxide, zinc oxide, barium oxide, vanadium pentaoxide, chromium oxide, and thorium oxide, and mixtures thereof; and complex oxides thereof.

Specific examples of the complex oxides of silica include, but are not particularly limited to, complex oxides of silica and an element of group 2 or 13 of the periodic system, such as silica-magnesia and silica-alumina. In the present embodiment, in addition to the two catalytic components mentioned above, an organic aluminum compound can be used, if necessary, as a catalytic component. The organic aluminum compound that can be used in the present embodiment is, for example, a compound represented by the following formula 14:

$$AlR^{16}{}_nX^5{}_{3-n} \qquad \text{Formula 14}$$

wherein $R^{16}$ represents an alkyl group having 1 to 12 carbon atoms or an aryl group having 6 to 20 carbon atoms, $X^5$ represents halogen, hydrogen, or an alkoxyl group, wherein the alkyl group is linear, branched, or cyclic, and n represents an integer of 1 to 3.

In this context, the organic aluminum compound may be a mixture of compounds represented by formula 14. In the organic aluminum compound that can be used in the present embodiment, examples of $R^{16}$ in the formula include a methyl group, an ethyl group, a butyl group, an isobutyl group, a hexyl group, an octyl group, a decyl group, a phenyl group, and a tolyl group. Examples of $X^5$ in the formula include a methoxy group, an ethoxy group, a butoxy group, and chloro.

Specific examples of the organic aluminum compound that can be used in the present embodiment include, but are not particularly limited to, trimethyl aluminum, triethyl aluminum, tributyl aluminum, triisobutyl aluminum, trihexyl aluminum, trioctyl aluminum, tridecyl aluminum, diethyl aluminum hydride, dibutyl aluminum hydride, and diisobutyl aluminum hydride. Alternatively, a mixture thereof may be used. Alternative examples of the organic aluminum compound that can be used in the present embodiment include reaction products of these organic aluminums and alcohols such as methyl alcohol, ethyl alcohol, butyl alcohol, pentyl alcohol, hexyl alcohol, octyl alcohol, and decyl alcohol, for example, dimethyl methoxy aluminum, dimethyl ethoxy aluminum, and dibutyl butoxy aluminum.

[Method for Producing Polyethylene Powder]

Examples of the polymerization method for the polyethylene in the method for producing the polyethylene powder of the present embodiment include methods for (co)polymerizing ethylene or monomers including ethylene by a suspension polymerization or vapor-phase polymerization method. Among them, the suspension polymerization method is preferred because this method can efficiently remove polymerization heat. In the suspension polymerization method, an inert hydrocarbon vehicle can be used as a vehicle. The olefin itself can also be used as a solvent.

Specific examples of such an inert hydrocarbon vehicle can include, but are not particularly limited to: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the method for producing the polyethylene powder, the polymerization temperature is generally 30° C. or higher and 100° C. or lower, preferably 40° C. or higher and 95° C. or lower, more preferably 50° C. or higher and 90° C. or lower. The polymerization temperature equal to or higher than 30° C. tends to realize efficient industrial production. On the other hand, the polymerization temperature equal to or lower than 100° C. tends to realize continuous stable operation.

In the method for producing the polyethylene powder, the polymerization pressure is generally atmospheric pressure or higher and 2 MPa or lower, preferably 0.1 MPa or higher and 1.5 MPa or lower, more preferably 0.12 MPa or higher and 1.0 MPa or lower. The polymerization pressure equal to or higher than atmospheric pressure tends to result in a polyethylene having a small total amount of Al, Mg, Ti, Zr, and Hf and a small total amount of chlorine. The polymerization pressure equal to or lower than 2 MPa tends to suppress partial heat generation ascribable to rapid polymerization reaction during the introduction of a catalyst, and realize stable polyethylene production.

The polymerization reaction can be carried out by any of batch, semicontinuous, and continuous methods. Continuous polymerization is preferred. A partial high-temperature state ascribable to rapid ethylene reaction can be suppressed by continuously supplying ethylene gas, a solvent, a catalyst, etc., into the polymerization system while continuously discharging them together with produced polyethylenes. Thus, the polymerization system is further stabilized. Ethylene reaction in a homogeneous state in the system prevents the formation of branches, double bonds, or the like in polymer chains and is less likely to cause reduction in molecular weight or cross-linking of polyethylenes. The resulting polyethylene powder decreases unmelted matter remaining when melted or dissolved, is prevented from being colored, and is less likely to present problems such as reduced mechanical properties. Accordingly, the continuous method, which achieves a more homogeneous polymerization system, is preferred.

Alternatively, the polymerization may be carried out at two or more stages differing in reaction conditions. The intrinsic viscosity of the resulting polyethylene can also be adjusted by the presence of hydrogen in the polymerization system or by the change of the polymerization temperature, as described in, for example, the specification of West German Patent Application Publication No. 3127133. The addition of hydrogen as a chain transfer agent into the polymerization system can control the intrinsic viscosity within a proper range. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less. In the present embodiment, in addition to each component as mentioned above, other components known in the art to be useful in polyethylene production can be included.

For the polymerization for the polyethylene, an antistatic agent such as Stadis 450 manufactured by The Associated Octel Company Ltd. (agent: Maruwa Bussan K.K.) may be used for suppressing the adherence of polymers to a polymerization reactor. Stadis 450 may be diluted with an inert hydrocarbon vehicle and then added to the polymerization reactor through a pump or the like. The amount of this dilution added is preferably in the range of 0.10 ppm or higher and 20 ppm or lower, more preferably in the range of 0.20 ppm or higher and 10 ppm or lower, with respect to the amount of the polyethylene produced per unit time.

A feature of the polyethylene powder according to the present embodiment is that, as mentioned above, the metal components are contained therein in the specific amount and the particle size falls within the specific range. The amount of the metal components within the specific range is achieved by the control of polyethylene productivity as mentioned above. Usually, higher ethylene polymer productivity is more desirable. Thus, those skilled in the art attempt to enhance this productivity. If means such as use of a catalyst having high polymerization activity is taken in order to enhance the productivity, the resulting powder has a decreased amount of a particle having a particle size of 75 μm or smaller. Thus, its particle size may not be adjusted to the range of the present embodiment. By contrast, the polyethylene powder according to the present embodiment can be obtained by, but not particularly limited to, the control of polymerization conditions as mentioned above. For example, the solid catalytic component serving as a primary catalyst and the promoter are generally added through separate inlet lines into the polymerization system. In the present embodiment, however, the solid catalytic component and the promoter are brought into contact with each other for a specific time and then added through the same inlet line into the polymerization system. In this case, a portion of the solid catalytic component comes off to form a fine powder. As a result, the amount of the metal components and the particle size of the powder can be adjusted to within proper ranges. In an alternative method, the amount of the metal components and the particle size of the powder may be adjusted to within proper range, for example, by use of a catalyst having a small particle size or a catalyst having a narrow particle size distribution as the catalyst.

[Additive]

The polyethylene powder of the present embodiment can be supplemented, if necessary, with an additive such as a slip agent, a neutralizer, an antioxidant, a light stabilizer, an antistatic agent, or a pigment.

Examples of the slip agent or the neutralizer include, but are not particularly limited to, aliphatic hydrocarbons, higher fatty acids, higher fatty acid metal salts, fatty acid esters of alcohols, waxes, higher fatty acid amides, silicone oil, and rosin. The amount of the slip agent or the neutralizer is not particularly limited and is 5000 ppm or lower, preferably 4000 ppm or lower, more preferably 3000 ppm or lower.

The antioxidant is not particularly limited and is preferably, for example, a phenol compound or a phenol-phosphorus compound. Specific examples thereof include: phenol antioxidants such as 2,6-di-t-butyl-4-methylphenol (dibutylhydroxytoluene), n-octadecyl-3-(4-hydroxy-3,5-di-t-butylphenyl)propionate, and tetrakis(methylene(3,5-di-t-butyl-4-hydroxyhydrocinnamate))methane; phenol-phosphorus antioxidants such as 6-[3-(3-t-butyl-4-hydroxy-5-methylphenyl)propoxy]-2,4,8,10-tetra-t-butyldibenzo[d,f][1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis(2,4-t-butylphenyl phosphite).

The amount of the antioxidant in the polyethylene powder according to the present embodiment is 100 ppm or higher and 5000 ppm or lower, preferably 100 ppm or higher and 4000 ppm or lower, more preferably 100 ppm or higher and 3000 ppm or lower. The polyethylene powder containing 100 ppm or higher of the antioxidant is less susceptible to embrittlement, discoloration, reduction in mechanical properties, etc., because of the suppressed degradation of the polyethylene, resulting in better long-term stability. The antioxidant contained in an amount of 5000 ppm or lower can suppress coloration ascribable to the antioxidant itself or a modified form of the antioxidant or coloration caused by the reaction of the antioxidant with the metal components.

Examples of the light stabilizer include, but are not particularly limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The amount of the light stabilizer is not particularly limited and is 5000 ppm or lower, preferably 3000 ppm or lower, more preferably 2000 ppm or lower.

Examples of the antistatic agent include, but are not particularly limited to, aluminosilicate, kaolin, clay, natural silica, synthetic silica, silicates, talc, diatomaceous earth, and glycerin fatty acid ester.

The amount of an organic additive contained in a fiber made of the polyethylene powder can be determined by Soxhlet extraction for 6 hours using tetrahydrofuran (THF) followed by the separation and quantification of the extract by liquid chromatography. The amount of an inorganic additive can be determined from the weight of ash resulting from the combustion of the polyethylene resin in an electric furnace.

[Fiber]

The fiber of the present embodiment is obtained using the polyethylene powder for a fiber. The fiber may comprise an antioxidant from the viewpoint of heat resistance and light resistance.

Examples of the antioxidant that may be contained in the fiber include, but are not particularly limited to, those listed above. The amount of the antioxidant contained in the fiber is preferably 100 ppm or higher and 5000 ppm or lower, more preferably 100 ppm or higher and 4000 ppm or lower, further preferably 100 ppm or higher and 3000 ppm or lower. The fiber containing the antioxidant in an amount of 100 ppm or higher is less susceptible to embrittlement, discoloration, reduction in mechanical properties, etc., because of the suppressed degradation of the polyethylene, resulting in better long-term stability. The antioxidant contained in an amount of 5000 ppm or lower can suppress coloration ascribable to the antioxidant itself or a modified form of the antioxidant or coloration caused by the reaction of the antioxidant with the metal components.

[Article]

The article of the present embodiment comprises the fiber and is selected from the group consisting of ropes, nets, bulletproof clothing, protective clothing, protective gloves, fiber-reinforced concrete products, and helmets. The fiber thus obtained from the polyethylene powder according to the present embodiment is industrially applicable to a wide range of uses including: high-performance textiles such as various types of sports clothing and various safety products (e.g., bulletproof clothing, protective clothing and protective gloves); various rope products such as tag ropes, mooring ropes, sailboat ropes, and construction ropes; various braid products such as fishing lines and blind cables; net products such as fishing nets and safety nets; reinforcement materials or various unwoven fabrics such as chemical filters and battery separators; screen materials such as tents; prepregs for sports (e.g., helmets and ski plates) or for speaker cones; and reinforcing fibers for composites for the reinforcement of concrete.

EXAMPLES

Hereinafter, the present invention will be described more specifically with reference to Examples and Comparative Examples. However, the present invention is not intended to be limited by Examples below by any means.

[Measurement Method and Conditions]

(1) Intrinsic Viscosity [η]

To 20 mL of decalin (containing 1 g/L BHT), 20 mg of each polyethylene powder was added. The polymer was dissolved by stirring at 150° C. for 2 hours. The falling time (ts) between gauges of the solution was measured in a thermostat bath of 135° C. using a Cannon-Fenske routine viscometer (SO). As a blank test, the falling time (tb) of decahydronaphthalene alone was measured without the addition of the polymer. The specific viscosity (ηsp/C) of the polymer was plotted according to the expression given below. The intrinsic viscosity ([η]) extrapolated to the concentration 0 was determined.

$$(\eta sp/C)=(ts/tb-1)/0.1$$

(2) Total Amount of Al, Mg, Ti, Zr, and Hf

Each polyethylene powder was pressure-decomposed using a microwave decomposition apparatus (model ETHOS TC, manufactured by Milestone General K.K.). The element concentrations of the metals magnesium, titanium, aluminum, and silicon in the polyethylene powder were measured by the internal standard method using ICP-MS (inductively coupled plasma-mass spectrometer, model X Series X7, manufactured by ThermoFisher Scientific K.K.). An article such as a membrane or a thread may be cut, and the total amount of Al, Mg, Ti, Zr, and Hf in the article can be measured by the measurement described above.

(3) Total Amount of Chlorine

Each polyethylene powder was burned in an automatic sample combustion apparatus (manufactured by Mitsubishi Chemical Analytech Co., Ltd., AQF-100) and then absorbed into an absorbing solution (mixed solution of Na $CO_3$ and NaHCO$_3$). The resulting absorbing solution was injected to an ion chromatography apparatus (manufactured by Nippon Dionex K.K., ICS1500, column (separation column: AS12A, guard column: AG12A) suppressor ASRS300) to measure the total amount of chlorine.

(4) Total Amount of Fe, Ni, Cu, Cr, and Mo

The total amount was measured in the same way as the measurement method described in "(2) Total amount of Al, Mg, Ti, Zr, and Hf".

(5) Amount of Particle Having Particle Size Exceeding 355 μm

The amount of a particle having a particle size exceeding 355 μm was determined as the sum of the weights of particles remaining on sieves having an aperture size of 355 μm or larger among all the particles in the measurement of "(7) Average particle size" described below.

(6) Amount of Particle Having Particle Size of 75 μm or Smaller

The amount of a particle having a particle size of 75 μm or smaller was determined as the sum of the weights of particles passing through a sieve having an aperture size of 75 μm among all the particles in the measurement of "(7) Average particle size" described below.

(7) Average Particle Size

The average particle size of each polyethylene powder was defined as a particle size that reached 50% by weight in an integral curve in which the weights of particles remaining on respective sieves in the classification of 100 g of particles using 10 types of sieves (aperture size: 710 μm, 500 μm, 425 μm, 355 μm, 300 μm, 212 μm, 150 μm, 106 μm, 75 μm, and 53 μm) stipulated by JIS Z8801 were integrated from the larger aperture size.

(8) Tap Density

The tap density of each polyethylene powder was measured by the method described in JIS K-7370:2000.

(9) Flowability

The flowability of each polyethylene powder was measured on the basis of a time required for the whole amount (50 g) of the polyethylene powder to fall through a funnel of a bulk specific gravity measurement apparatus described in JIS K-6721:1997.

(10) Amount of Volatile Component

The amount of a volatile component in each polyethylene powder was determined by the measurement of the rate of change in weight after drying of the polyethylene powder (30.0 g) in vacuum at 80° C. for 15 hours. The calculation expression is shown below.

Amount of a volatile component=[(Weight before the drying)−(Weight after the drying)]/(Weight before the drying)×100

(11) Critical Draw Ratio

For the critical draw ratio, a feed roll speed (A) of a primarily drawn thread prepared by a method mentioned later in Examples was kept constant, and the thread was secondarily drawn with a take-up roll speed increased. The highest speed (B) at which the thread was broken was measured 10 times. The average of the measurement values was used as the critical draw ratio. The calculation expression is shown below.

Critical draw ratio=B/A (Evaluation Criteria)
 ⊚ (Excellent): ×20 or more
 ○ (Fair): ×15 or more and less than ×20
 X (Poor): less than ×15

(12) b Value

The b value was determined by the measurement of a sheet of 1 mm in thickness prepared by a method mentioned later in Examples using Spectro Photo Meter TOPSCAN TC-1800MK III manufactured by Tokyo Denshoku Co., Ltd.

(Evaluation Criteria)
 ⊚ (Excellent): less than 2.0
 ○ (Fair): 2.0 or more and less than 2.3
 X (Poor): 2.3 or more

(13) Evaluation of Weather Durability Under Stress

The weather durability was evaluated using a fiber whose fiber diameter was adjusted to 30 μm by drawing at a ratio of ×4 to ×5 in secondary drawing in fiber preparation mentioned later. One end of this fiber was fixed to a round bar, and a weight of 10 g was suspended from the other end to adjust the distance between supports to 10 cm. Ten such filaments were used. Sunshine carbon arc light-type (conforming to JIS K5400 (1990)) accelerated weathering test was conducted under stress using Sunshine Weather Meter manufactured by Suga Test Instruments Co., Ltd. The black panel temperature was set to 63° C., and the rain cycle was set to 18 min/2 hours.

(Evaluation Criteria)
 ⊚ (Excellent): The number of end breakages was 0 to 2/10 filaments
 ○ (Fair): The number of end breakages was 3 to 4/10 filaments
 X (Poor): The number of end breakages was 5 or more/10 filaments

[Method for Synthesizing Catalyst]

Reference Example 1: Catalyst Synthesis Example 1: Preparation of Solid Catalytic Component [A]

To an 8 L stainless autoclave purged with nitrogen, 1,600 mL of hexane was added. To this autoclave, 800 mL of a hexane solution containing 1 mol/L titanium tetrachloride and 800 mL of a hexane solution containing 1 mol/L organic magnesium compound represented by the compositional formula AlMg$_5$(C$_4$H$_9$)$_{11}$(OSiH)$_2$ were added at the same time over 4 hours with stirring at 10° C. After the addition, the mixture was gradually heated, and the reaction was continued at 10° C. for 1 hour. After the completion of the reaction, 1,600 mL of the supernatant was removed, and the resulting solid was washed with 1,600 mL of hexane ten times to prepare solid catalytic component [A]. The amount of titanium contained per g of this solid catalytic component was 3.05 mmol.

Reference Example 2: Catalyst Synthesis Example 2: Preparation of Solid Catalytic Component [B]

(1) Synthesis of Carrier (B-1)

An 8 L stainless autoclave fully purged with nitrogen was charged with 1000 mL of a hexane solution containing 2 mol/L hydroxytrichlorosilane, and 2550 mL (corresponding to 2.68 mol of magnesium) of a hexane solution of an organic magnesium compound represented by the compositional formula AlMg$_5$(C$_4$H$_9$)$_{11}$(OC$_4$H$_9$)$_2$ was added dropwise thereto over 4 hours with stirring at 65° C. The reaction was continued with further stirring at 65° C. for 1 hour. After the completion of the reaction, the supernatant was removed, and the resulting solid was washed with 1800 mL of hexane four times. As a result of analyzing this solid (carrier (B-1)), 8.31 mmol of magnesium was contained per g of the solid.

(2) Preparation of Solid Catalytic Component [B]

To 1970 mL of the hexane slurry containing 110 g of the carrier (B-1), 110 mL of a hexane solution containing 1 mol/L titanium tetrachloride and 110 mL of a hexane solution containing 1 mol/L of an organic magnesium compound represented by the compositional formula $AlMg_5(C_4H_9)_{11}(OSiH)_2$ were added at the same time over 1 hour with stirring at 10° C. After the addition, the reaction was continued at 10° C. for 1 hour. After the completion of the reaction, 1100 mL of the supernatant was removed, and the resulting solid was washed with 1100 mL of hexane twice to prepare a solid catalytic component [B]. The amount of titanium contained in 1 g of this solid catalytic component [B] was 0.75 mmol.

Reference Example 3: Catalyst Synthesis Example 3: Preparation of Supported Metallocene Catalytic Component [C]

Spherical silica having an average particle size of 15 μm, a surface area of 700 m$^2$/g, and an intra-particle pore volume of 1.8 mL/g was fired at 500° C. for 5 hours in the nitrogen atmosphere for dehydration. The amount of surface hydroxy groups on the dehydrated silica was 1.85 mmol/g per $SiO_2$. In a 1.8 L autoclave, 40 g of this dehydrated silica was dispersed in 800 mL of hexane in the nitrogen atmosphere to obtain slurry. While the temperature of the obtained slurry was kept at 50° C. with stirring, 80 mL of a hexane solution of triethyl aluminum (concentration: 1 mol/L) was added thereto. Then, the mixture was stirred for 2 hours such that the triethyl aluminum was reacted with the surface hydroxy groups of the silica to obtain component [a] containing triethyl aluminum-treated silica (in which the surface hydroxy groups of the triethyl aluminum-treated silica were capped by the triethyl aluminum) and a supernatant. Then, the supernatant in the obtained reaction mixture was removed by decantation to remove unreacted triethyl aluminum in the supernatant. Then, an appropriate amount of hexane was added to the resulting silica to obtain 880 mL of hexane slurry of triethyl aluminum-treated silica.

Meanwhile, [(N-t-butylamido) (tetramethyl-η$^5$-cyclopentadienyl)dimethylsilane]titanium-1,3-pentadiene (hereinafter, referred to as a "titanium complex") was dissolved at 200 mmol in 1000 mL of Isopar E [trade name of hydrocarbon mixture manufactured by Exxon Chemical Co., Inc. (US)]. To this solution, 20 mL of a hexane solution containing 1 mol/L compound of the formula $AlMg_6(C_2H_5)_3(n-C_4H_9)_y$, synthesized in advance from triethyl aluminum and dibutyl magnesium was added. The titanium complex concentration was adjusted to 0.1 mol/L by the addition of hexane to obtain component [b].

Bis(hydrogenated tallow alkyl)methylammonium-tris(pentafluorophenyl)(4-hydroxyphenyl) borate (hereinafter, referred to as a "borate") (5.7 g) was added to 50 mL of toluene and dissolved therein to obtain a 100 mmol/L toluene solution of the borate. To this toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 1 hour to obtain a reaction mixture containing the borate.

To 800 mL of the slurry of the component [a] obtained above, 46 mL of this reaction mixture containing the borate was added with stirring at 15 to 20° C. to allow the borate to be supported by the silica. In this way, slurry of the borate-supported silica was obtained. To this slurry, 32 mL of the component [b] obtained above was further added, and the mixture was stirred for 3 hours such that the titanium complex was reacted with the borate. In this way, supported metallocene catalyst [C] containing silica with a catalytic active species formed thereon, and a supernatant was obtained.

Then, the supernatant in the obtained reaction mixture was removed by decantation to remove unreacted triethyl aluminum in the supernatant.

Comparative Example 1

[Polymerization Step for Polyethylene]

Hexane, ethylene, and the catalyst were continuously supplied to a vessel-type 300 L polymerization reactor equipped with a stirring apparatus. The polymerization temperature was kept at 75° C. by jacket cooling. The hexane was supplied from the bottom of the polymerization reactor at a rate of 80 L/hr. The solid catalytic component [A] and triisobutyl aluminum as a promoter were used. The solid catalytic component [A] was added from the intermediate portion between the surface of the solution in the polymerization reactor and the bottom of the reaction at a rate of 0.22 g/hr. The triisobutyl aluminum was added through an inlet line different from that of the solid catalytic component [A] from the intermediate portion between the surface of the solution in the polymerization reactor and the bottom of the reaction at a rate of 10 mmol/hr. The ethylene was supplied from the bottom of the polymerization reactor to keep the polymerization pressure at 0.2 MPa. The production rate for the polyethylene was 10 kg/hr. The polymer slurry was continuously discharged into a flash drum having a pressure of 0.05 MPa and a temperature of 65° C. such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the amount of the materials such as the solvent was 45% with respect to the polymer. In this respect, stable continuous operation was successfully performed without generating polymer clumps and also without blocking the slurry-discharging piping. The separated polyethylene powder was dried with nitrogen blowing at 85° C. for 4 hours. In this drying step, steam was sprayed onto the powder after the polymerization to deactivate the catalyst and the promoter. The obtained polyethylene powder was passed through a sieve having an aperture size of 425 μm such that particles that failed to pass through the sieve was removed to obtain polyethylene powder PE6 of Comparative Example 1. The physical properties of the obtained polyethylene powder PE6 are shown in Table 1.

(Preparation of Fiber)

Decalin (manufactured by Hiroshima Wako Co., Ltd.) (5% by mass) was added into the polyethylene powder PE6 (95% by mass) supplemented with 500 ppm of n-octadecyl-3-(4-hydroxy-3,5-di-t-butylphenyl)propionate as an antioxidant to prepare a liquid in a slurry form. This liquid in a slurry form was added into an extruder with a temperature set to 280° C. and a melt residence time set to 15 minutes to form a homogeneous solution. This solution was spun at a discharge rate of 1.1 g/min per pore using a spinneret (pore size: 0.7 mm) set to 180° C. The discharged thread containing the solvent was charged into a water bath of 10° C. via an air gap of 3 cm and wound at a rate of 40 m/min while rapidly cooled. Subsequently, the thread was dried in vacuum under conditions of 40° C. for 24 hours to remove the solvent. The obtained thread was brought into contact with a metal heater such that the temperature of the thread reached 130° C. The thread was primarily drawn at a draw ratio of ×4, and the drawn thread was wound. Subsequently, the drawn thread was brought into contact with a metal heater such that the temperature of the drawn thread reached 155° C. The thread was further secondarily drawn. The draw ratio immediately before breakage of the thread was used as a critical draw ratio. The critical draw ratio was ×11.

(Preparation of Sheet for b Value Measurement)

Liquid paraffin (manufactured by MORESCO Corp.; Moresco White P-350P) (90% by mass) was added into the polyethylene powder PE7 (10% by mass) supplemented with 500 ppm of n-octadecyl-3-(4-hydroxy-3,5-di-t-butyl-phenyl)propionate as an antioxidant to prepare a liquid in a slurry form. This liquid in a slurry form was kneaded at 190° C. and 50 rpm for 60 minutes using a batch-type melt kneading machine (manufactured by Toyo Seiki Seisaku-Sho Ltd.; LABO PLASTOMILL). The obtained kneaded product was molded at 1 MPa in a hot press of 190° C. and directly heat-treated for 3 minutes. Then, the pressure was raised to 10 MPa, and the product was further kept in this state for 3 minutes. The product was cooled at 5 MPa in a water-cooled press controlled at 25° C. to prepare a sheet having a thickness of 1 mm. This sheet was cut into 5 cm square, dipped in 100 mL of xylene, and left standing for 1 hour, followed by the removal of the supernatant xylene solution. This operation was repeated three times to completely extract the liquid paraffin from the sheet. The sheet was dried in air at room temperature for 12 hours and then dried in hot air for 3 hours using a gear oven set to 80° C. to prepare a sheet for b value measurement. The b value of the obtained polyethylene sheet was 2.1.

Example 1

Hexane, ethylene, and the catalyst were continuously supplied to a vessel-type 300 L polymerization reactor equipped with a stirring apparatus. The polymerization temperature was kept at 70° C. by jacket cooling. The hexane was supplied from the bottom of the polymerization reactor at a rate of 80 L/hr. The solid catalytic component [A] and triisobutyl aluminum as a promoter were used. The solid catalytic component [A] was added from the intermediate portion between the surface of the solution in the polymerization reactor and the bottom of the reaction at a rate of 0.2 g/hr. The triisobutyl aluminum was added through the same inlet line as that of the solid catalytic component [A] at a rate of 10 mmol/hr after being brought into contact with the solid catalytic component [A]. The contact time between the solid catalytic component [A] and the triisobutyl aluminum was adjusted to 30 seconds. The ethylene was supplied from the bottom of the polymerization reactor to keep the polymerization pressure at 0.2 MPa. The production rate for the polyethylene was 10 kg/hr. The polymer slurry was continuously discharged into a flash drum having a pressure of 0.05 MPa such that the level of the polymerization reactor was kept constant to separate unreacted ethylene. In the flash tank, 5% humidified nitrogen was blown into the solution at a rate of 1.5 m³/hr, and its internal temperature was adjusted to 35 to 40° C. by jacket cooling. The residence time of the slurry in the flash drum was 0.8 hours. The polymer slurry was continuously sent to a centrifuge such that the level of the flash drum was kept constant to separate the polymer from the other materials such as the solvent. In this operation, the amount of the materials such as the solvent was 45% with respect to the polymer. In this respect, stable continuous operation was successfully performed without generating polymer clumps and also without blocking the slurry-discharging piping. The separated polyethylene powder was dried with nitrogen blowing at 85° C. for 4 hours. In this drying step, steam was sprayed onto the powder after the polymerization to deactivate the catalyst and the promoter. The obtained polyethylene powder was passed through a sieve having an aperture size of 425 μm such that particles that failed to pass through the sieve was removed to obtain polyethylene powder PE1 of Example 1. The physical properties of the obtained polyethylene powder PE1 are shown in Table 1. Evaluation was conducted in the same way as in Comparative Example 1 using the obtained polyethylene powder PE1. The results are shown in Table 1.

Example 2

Polyethylene powder PE2 of Example 2 was obtained by the same operation as in Example 1 except that the polymerization temperature was set to 60° C., the polymerization pressure was set to 0.3 MPa, and the solid catalytic component [A] was fed at a rate of 0.17 g/hr. The amount of the materials such as the solvent was 42% with respect to the polymer after centrifugation. Evaluation was conducted in the same way as in Example 1 using the obtained polyethylene powder PE2. The results are shown in Table 1.

Example 3

Polyethylene powder PE3 of Example 3 was obtained by the same operation as in Example 1 except that the polymerization temperature was set to 75° C., the polymerization pressure was set to 0.3 MPa, and the solid catalytic component [B] was fed as the solid catalytic component at a rate of 0.15 g/hr. The amount of the materials such as the solvent was 47% with respect to the polymer after centrifugation. Evaluation was conducted in the same way as in Example 1 using the obtained polyethylene powder PE3. The results are shown in Table 1.

Example 4

Polyethylene powder PE4 of Example 4 was obtained by the same operation as in Example 1 except that the polymerization temperature was set to 40° C., the polymerization pressure was set to 0.3 MPa, and the solid catalytic component [A] was fed at a rate of 0.5 g/hr. Also, a fiber and a sheet for b value measurement were obtained by the same operation as in Example 1 except that the antioxidant was added at 900 ppm. The amount of the materials such as the solvent was 43% with respect to the polymer after centrifugation. Evaluation was conducted in the same way as in Example 1 using the obtained polyethylene powder PE4. The results are shown in Table 1.

Example 5

Polyethylene powder PE5 of Example 5 was obtained by the same operation as in Example 1 except that the polymerization temperature was set to 30° C., the polymerization pressure was set to 0.3 MPa, and the solid catalytic component [C] was fed as the solid catalytic component at a rate of 1.2 g/hr. The amount of the materials such as the solvent was 42% with respect to the polymer after centrifugation. Evaluation was conducted in the same way as in Example 1 using the obtained polyethylene powder PE5. The results are shown in Table 1.

Comparative Example 2

The polyethylene powder obtained in Example 1 was classified through a sieve having an aperture size of 75 μm to obtain powder PE7 that remained on the sieve. The amount of the materials such as the solvent was 44% with respect to the polymer after centrifugation. Evaluation was conducted in the same way as in Comparative Example 1 using the obtained polyethylene powder PE7. The results are shown in Table 1.

Comparative Example 3

Polyethylene powder PE8 of Comparative Example 3 was obtained by the same operation as in Comparative Example 1 except that a polyethylene powder using a polymerization pressure of 0.3 MPa and the solid catalytic component [B] at a rate of 0.15 g/hr as the solid catalytic component was directly used without the use of the sieve having an aperture size of 425 μm and supplemented with 5500 ppm of the antioxidant. The amount of the materials such as the solvent was 45% with respect to the polymer after centrifugation. Evaluation was conducted in the same way as in Comparative Example 1 using the obtained polyethylene powder PE8. The results are shown in Table 1.

Comparative Example 4

Polyethylene powder PE9 of Comparative Example 4 was obtained by the same operation as in Comparative Example 1 except that the polymerization temperature was set to 40° C., the polymerization pressure was set to 0.3 MPa, and the solid catalytic component [B] was fed as the solid catalytic component at a rate of 2.0 g/hr. The amount of the materials such as the solvent was 44% with respect to the polymer after centrifugation. Evaluation was conducted in the same way as in Comparative Example 1 using the obtained polyethylene powder PE9. The results are shown in Table 1.

Comparative Example 5

Ethylene was supplied to a vessel-type 300 L polymerization reactor (containing the whole amount (142 L) of hexane) equipped with a stirring apparatus from the bottom of the polymerization reactor to adjust the polymerization pressure to 0.2 MPa. Triisobutyl aluminum (10 mmol/L of hexane) was added as a promoter from the intermediate portion between the surface of the solution in the polymerization reactor and the bottom of the reaction. Then, the solid catalytic component [A] (0.2 g/L of hexane) was added thereto over 30 seconds from the intermediate portion between the surface of the solution in the polymerization reactor and the bottom of the reaction to start polymerization reaction. During the polymerization reaction, ethylene was also constantly supplied thereto to keep the polymerization pressure at 0.2 MPa. The polymerization temperature was kept at from 70° C. (polymerization initiation temperature) to 78° C. (peak temperature) by jacket cooling. After a lapse of 1 hour, the polymerization reactor was depressurized to remove unreacted ethylene. The polymerization system was purged with nitrogen. Then, the temperature of the polymer slurry was lowered to 40° C. The polymerization reaction was completely stopped by the addition of methanol in a small amount. Next, the polymer slurry was sent to a filtration vessel equipped with a 500-mesh filter to separate the polymer from the materials such as the solvent. In this operation, the amount of the materials such as the solvent was 185% with respect to the polymer. In this respect, polymer clumps were present, and polymers attached to the wall of the polymerization reactor were also present. The subsequent steps were carried out in the same way as in Comparative Example 1 to obtain polyethylene powder PE10 of Comparative Example 5. Evaluation was conducted in the same way as in Comparative Example 1 using the obtained polyethylene powder PE10. The results are shown in Table 1.

TABLE 1

| | Example | | | | | Comparative Example | | | | |
|---|---|---|---|---|---|---|---|---|---|---|
| Ethylene polymer | 1 PE1 | 2 PE2 | 3 PE3 | 4 PE4 | 5 PE5 | 1 PE6 | 2 PE7 | 3 PE8 | 4 PE9 | 5 PE10 |
| Intrinsic viscosity (dL/g) | 13.8 | 19.7 | 19.1 | 30.5 | 17.5 | 7.3 | 13.8 | 19.7 | 41.1 | 30.1 |
| Amount of particle having particle size exceeding 355 μm (wt %) | 0.6 | 0.9 | 1.2 | 1.5 | 0.3 | 0.2 | 0.6 | 5.0 | 1.0 | 1.8 |
| Amount of particle having particle size of 75 μm or smaller (wt %) | 4 | 3 | 10 | 7 | 3 | 15 | 0 | 3 | 14 | 22 |
| Total amount of Al, Mg, Ti, Zr, and Hf (ppm) | 4.6 | 5.6 | 10.9 | 5.8 | 5.1 | 5.5 | 4.8 | 13.1 | 25.1 | 16.0 |
| Total amount of Ti, Zr, and Hf (ppm) | 1.5 | 2.0 | 1.8 | 2.5 | 1.9 | 2.0 | 1.6 | 2.0 | 4.0 | 4.0 |
| Total amount of Al (ppm) | 1.9 | 2.1 | 2.1 | 2.2 | 3.1 | 2.1 | 1.9 | 2.1 | 3.1 | 7.4 |
| Total amount of Mg (ppm) | 1.2 | 1.5 | 7.0 | 1.1 | 0.1 | 1.4 | 1.3 | 9.0 | 18.0 | 4.6 |
| Total amount of chlorine ppm) | 1> | 1> | 4 | 3 | 1> | 1> | 1> | 1> | 21 | 21 |
| Total amount of Fe, Ni, Cu, Cr, and Mo (ppm) | 1> | 1> | 1> | 1> | 1> | 1> | 1> | 1> | 5 | 3 |
| Tap density (g/cm3) | 0.58 | 0.58 | 0.57 | 0.55 | 0.62 | 0.51 | 0.53 | 0.53 | 0.48 | 0.54 |
| Average particle size (μm) | 167 | 154 | 145 | 170 | 141 | 110 | 172 | 225 | 190 | 90 |
| Amount of volatile component (% by mass) | 0.1 | 0.1 | 0.1 | 0.2 | 0.0 | 0.1 | 0.1 | 0.1 | 0.2 | 0.7 |
| Flowability (sec) | 23 | 22 | 24 | 26 | 29 | 30 | 20 | 35 | 33 | 60< |
| Amount of antioxidant (ppm) | 500 | 500 | 500 | 900 | 500 | 500 | 500 | 5500 | 500 | 500 |
| Critical draw ratio | ◎ | ◎ | ○ | ○ | ○ | X | X | X | X | X |
| b Value | ◎ | ○ | ◎ | ○ | ◎ | ○ | ○ | X | X | X |
| Evaluation of weather durability | ◎ | ◎ | ◎ | ◎ | ◎ | X | X | X | X | X |

These results demonstrated that the polyethylene powder of the present invention is excellent in heat resistance and weather resistance and is less likely to be colored because the polyethylene powder contains small amounts of metal components, chlorine, and the like. The polyethylene powders of Comparative Examples were left undissolved due to poor solubility and were present in this residual state in the solutions. The polyethylene powders were therefore easily broken when processed into fibers. By contrast, the polyethylene powders of Examples were shown to be highly drawable and have favorable solubility.

INDUSTRIAL APPLICABILITY

The polyethylene powder of the present invention is excellent in solubility as well as heat resistance and weather resistance and is less likely to be colored. The polyethylene powder of the present invention is therefore industrially applicable to a wide range of uses such as high-strength fibers for use in ropes, nets, bulletproof clothing, protective clothing, protective gloves, fiber-reinforced concrete products, helmets, etc.

The invention claimed is:

1. A polyethylene powder, wherein
an intrinsic viscosity measured at 135° C. in decalin is 10 dL/g or higher and 40 dL/g or lower,
a total amount of Al, Mg, Ti, Zr, and Hf is 1.0 ppm or higher and lower than 15 ppm,
an amount of a particle having a particle size exceeding 355 μm is 2.0% by mass or lower, and
a total amount of particles having particle sizes of 75 μm or smaller is 3.0% by mass or higher and 10.0% by mass or lower.

2. The polyethylene powder according to claim 1, wherein a total amount of chlorine is 20 ppm or lower.

3. The polyethylene powder according to claim 1, wherein a total amount of Fe, Ni, Cu, Cr, and Mo is 3.0 ppm or lower.

4. The polyethylene powder according to claim 1, wherein a tap density according to JIS K-7370:2000 is 0.50 g/cm$^3$ or higher and 0.65 g/cm$^3$ or lower.

5. The polyethylene powder according to claim 1, wherein a powder flowability is 40 seconds or less, wherein the powder flowability is measured based on time required for 50 g of the polyethylene powder to fall through a funnel of a bulk specific gravity measurement apparatus according to JIS K-6721:1997.

6. The polyethylene powder according to claim 1, comprising an ethylene homopolymer.

7. The polyethylene powder according to claim 1, wherein an amount of a volatile component is 0.30% by mass or lower.

8. A fiber which is obtained using the polyethylene powder according to claim 1.

9. The fiber according to claim 8, comprising an antioxidant, wherein an amount of the antioxidant is 100 ppm or higher and 5000 ppm or lower.

10. An article comprising the fiber according to claim 8, the article being selected from the group consisting of ropes, nets, bulletproof clothing, protective clothing, protective gloves, fiber-reinforced concrete products, and helmets.

11. The polyethylene powder according to claim 1, wherein a total amount of particles having particle sizes of 75 μm or smaller is 5.0% by mass or higher and 10.0% by mass or lower.

* * * * *